United States Patent
Bak

(10) Patent No.: US 6,298,658 B1
(45) Date of Patent: Oct. 9, 2001

(54) MULTI-STABLE THRUST VECTORING NOZZLE

(75) Inventor: Michael J. Bak, White Lake, MI (US)

(73) Assignee: Williams International Co., L.L.C., Walled Lake, MI (US)

( * ) Notice: Subject to any disclaimer, the term of this patent is extended or adjusted under 35 U.S.C. 154(b) by 0 days.

(21) Appl. No.: 09/451,898

(22) Filed: Dec. 1, 1999

(51) Int. Cl.$^7$ ................................................ F02K 1/00
(52) U.S. Cl. ................ 60/231; 239/265.11; 239/265.17; 239/265.19; 239/265.23; 239/265.39
(58) Field of Search ................... 60/231; 239/265.11, 239/265.19, 265.23, 265.39, 265.17

(56) References Cited

U.S. PATENT DOCUMENTS

| | | | |
|---|---|---|---|
| 2,916,873 | 12/1959 | Walker | 60/35.54 |
| 3,036,430 | 5/1962 | Eggers et al. | 60/35.54 |
| 3,143,856 | 8/1964 | Hausmann | 60/35.54 |
| 3,204,405 | 9/1965 | Warren et al. | 60/35.54 |
| 3,221,498 | 12/1965 | Bankston | 60/35.54 |
| 3,229,460 | 1/1966 | Jones | 60/35.54 |
| 3,268,175 | 8/1966 | Hausmann | 2239/265.23 |
| 3,282,051 | 11/1966 | Unfried . | |
| 3,311,306 * | 3/1967 | Jones et al. | 239/265.27 |
| 3,325,103 | 6/1967 | Abbott | 239/265.17 |
| 3,354,645 | 11/1967 | Hsia | 60/204 |
| 3,420,060 | 1/1969 | Ostroff et al. | 60/264 |
| 3,452,769 | 7/1969 | Jones et al. | 137/81.5 |
| 3,508,579 | 4/1970 | Jones | 137/610 |
| 3,698,642 | 10/1972 | McCullough | 239/265.23 |
| 3,726,496 | 4/1973 | Leonard | 244/3.22 |
| 3,737,103 | 6/1973 | Howell et al. | 239/265.23 |
| 3,740,003 | 6/1973 | Ayre et al. | 244/3.22 |
| 3,780,763 | 12/1973 | Wisniewski | 137/599 |
| 3,806,063 | 4/1974 | Fitzgerald | 244/3.22 |
| 3,926,373 | 12/1975 | Viets . | |
| 3,995,662 | 12/1976 | Fitzgerald et al. | 137/825 |
| 4,018,384 | 4/1977 | Fitzgerald et al. | 239/265.19 |
| 4,063,685 | 12/1977 | Jacobs | 239/265.17 |
| 4,077,572 * | 3/1978 | Fitzgerald | 239/265.17 |
| 4,351,479 | 9/1982 | Kranz et al. | 239/265.23 |
| 4,384,690 | 5/1983 | Brodersen | 244/3.22 |
| 4,537,371 | 8/1985 | Lawhorn et al. | 244/3.22 |
| 4,686,824 | 8/1987 | Dunaway et al. | 60/231 |
| 4,779,821 | 10/1988 | Sutton | 244/52 |
| 4,856,734 | 8/1989 | Davies | 244/3.22 |

* cited by examiner

Primary Examiner—Charles G. Freay
Assistant Examiner—Ed Hayes

(57) ABSTRACT

A stream of primary gas flowing through a bi-stable thrust vectoring nozzle becomes attached to a first or second surface extending downstream of the nozzle, each surface incorporating one or more control ports for controlling to which surface the stream is attached, wherein relative to the longitudinal axis of the nozzle, the angle of discharge from the first surface is substantially different from the angle of discharge from the second surface, preferably with the first surface substantially aligned with the longitudinal axis of the nozzle. In one embodiment, a plurality of nozzles are arranged with the respective first surfaces substantially aligned with the longitudinal axis of the nozzle combination and each of the respective second surfaces arranged to laterally deflect a respective portion of the stream of primary gas in a respective direction along each of two orthogonal lateral axes.

27 Claims, 17 Drawing Sheets

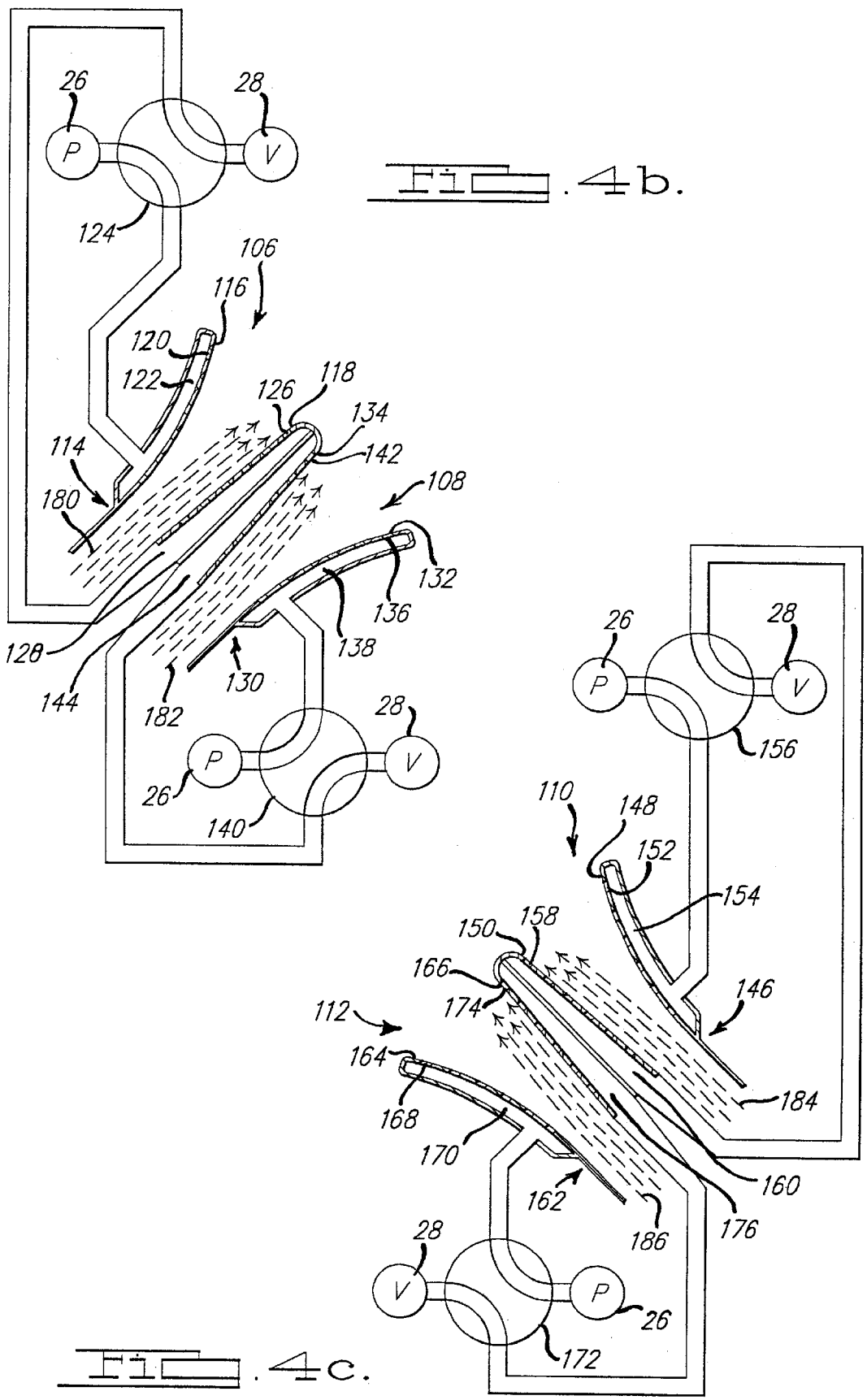

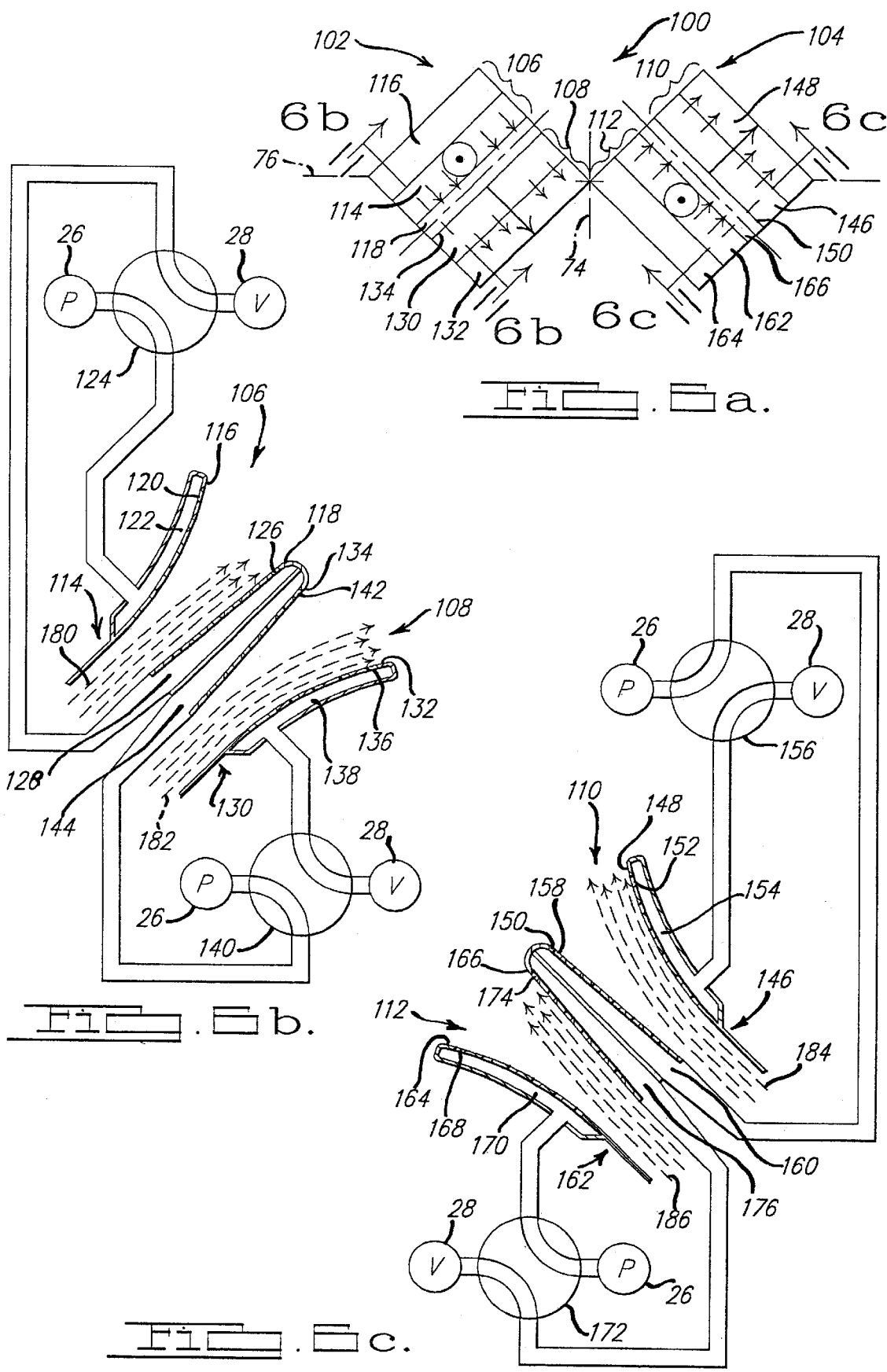

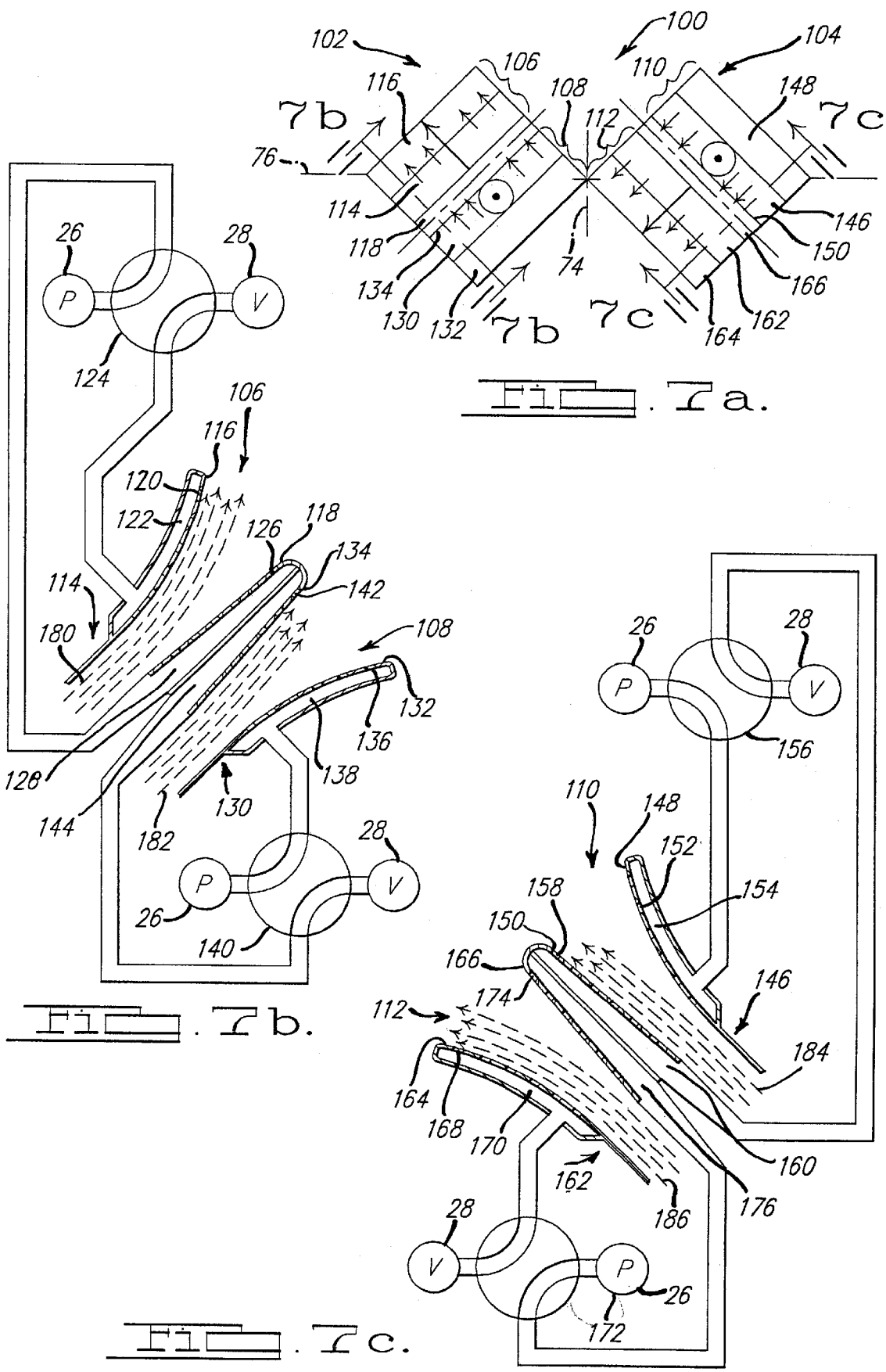

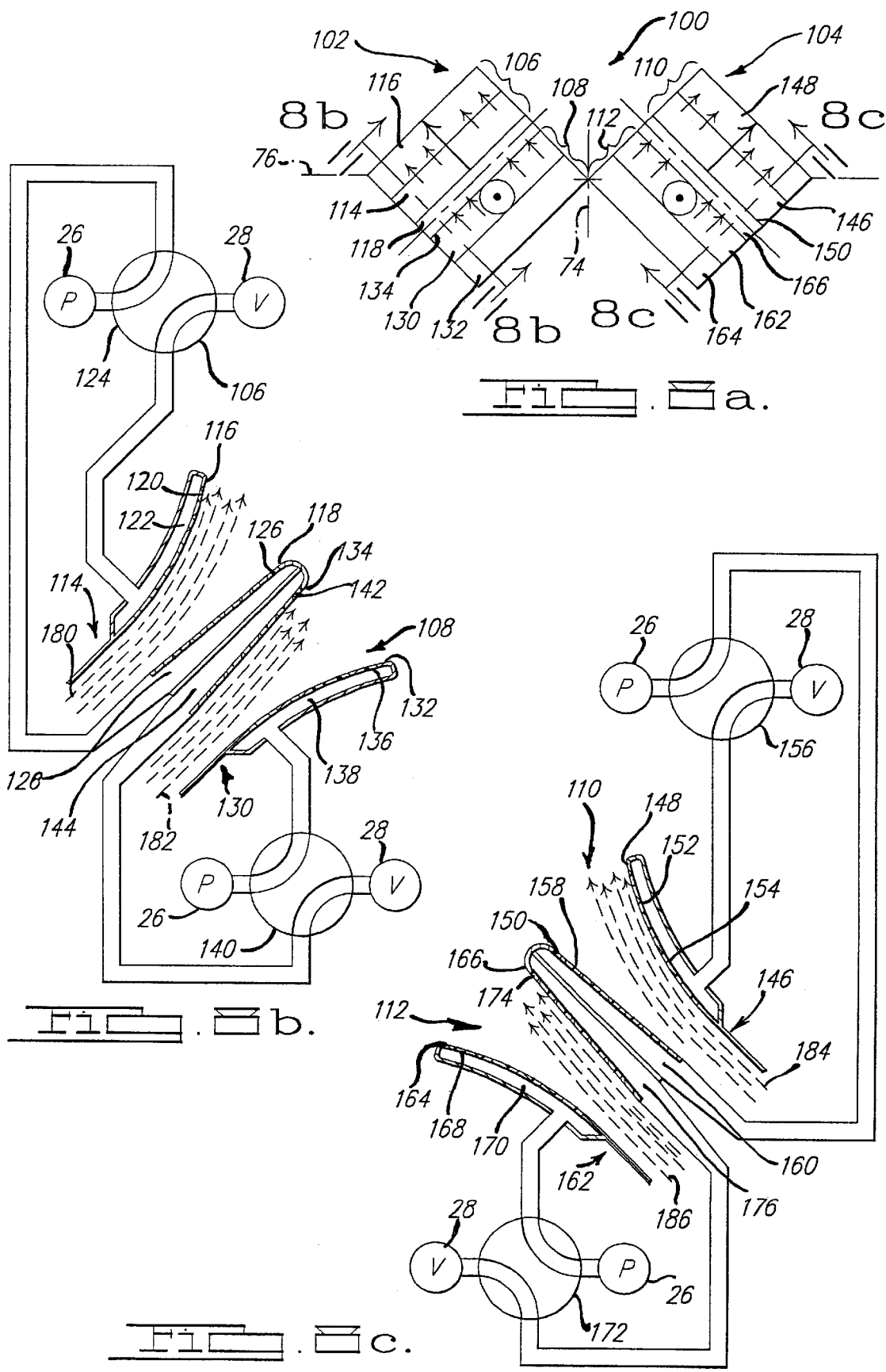

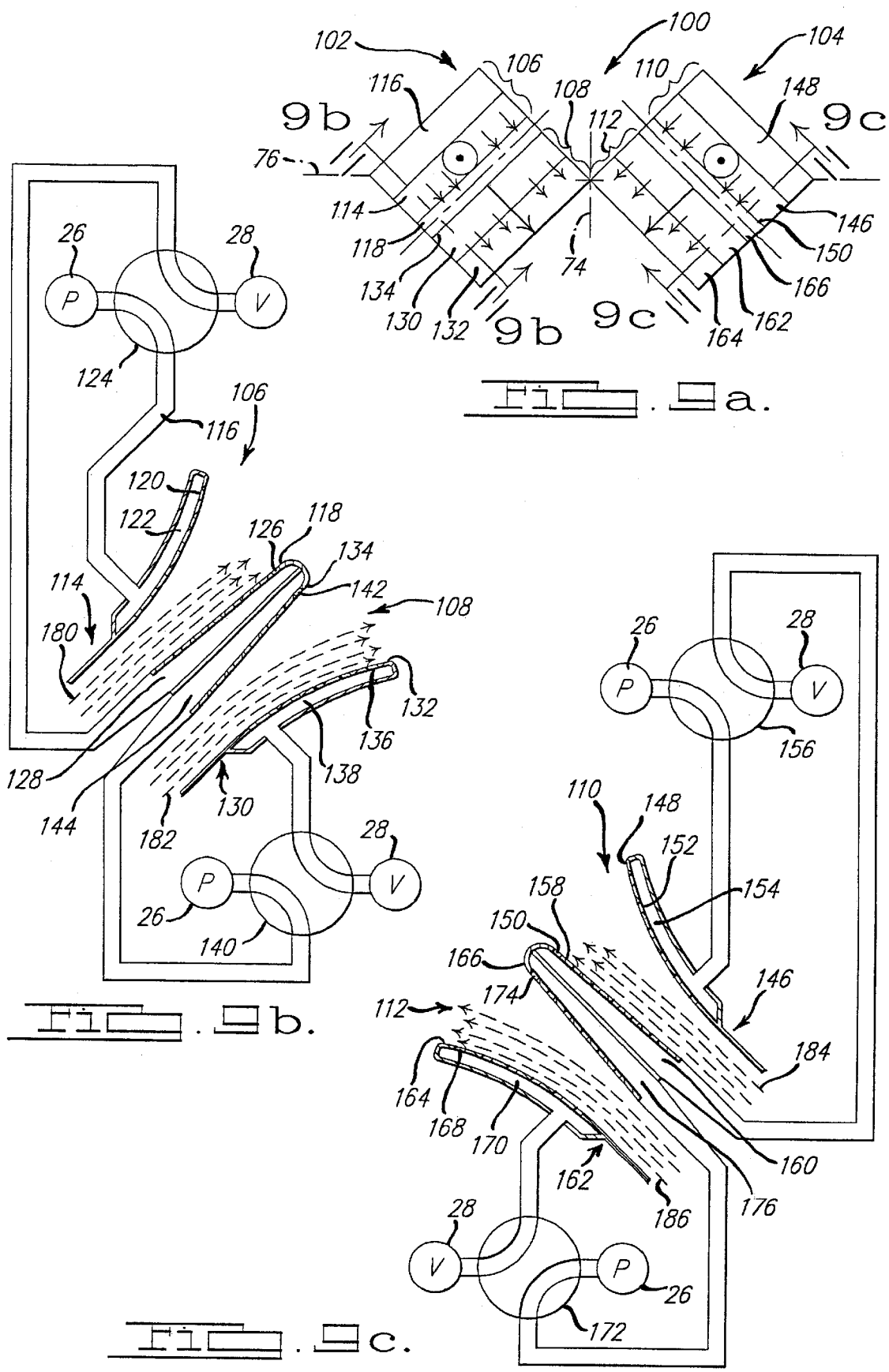

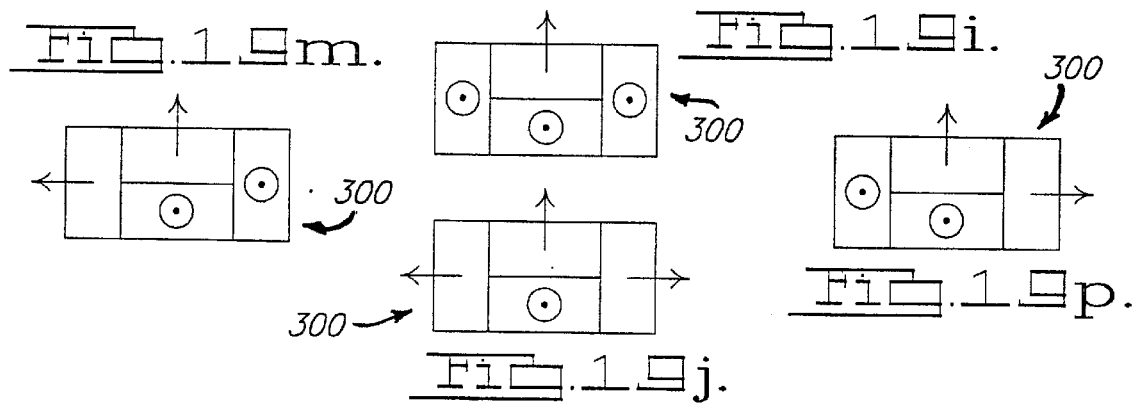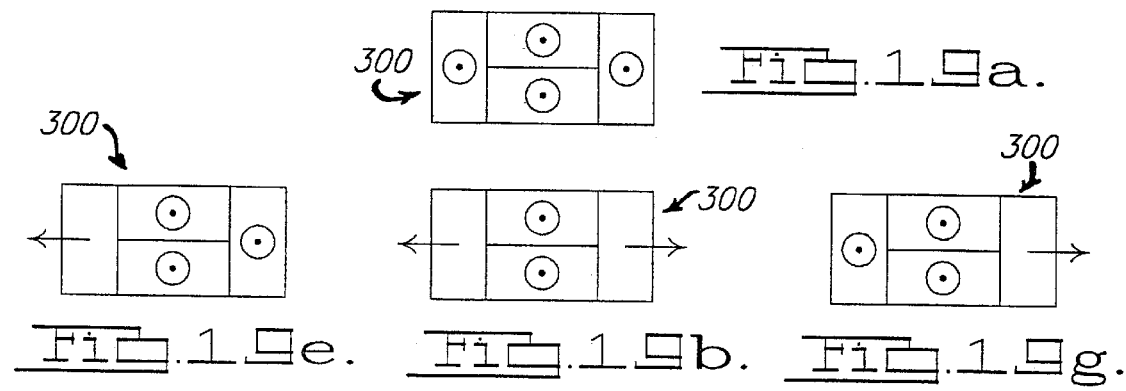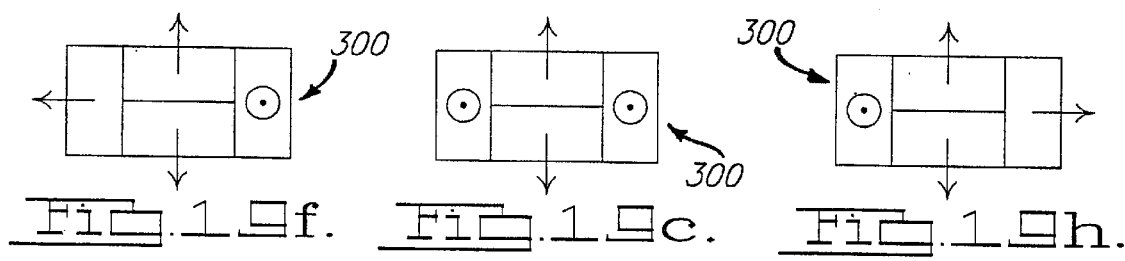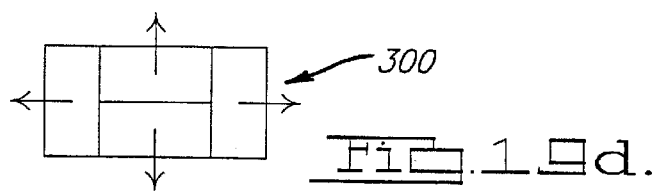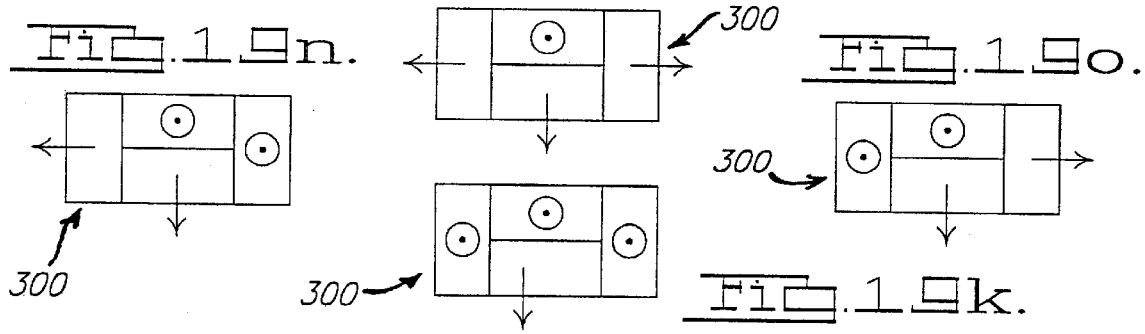

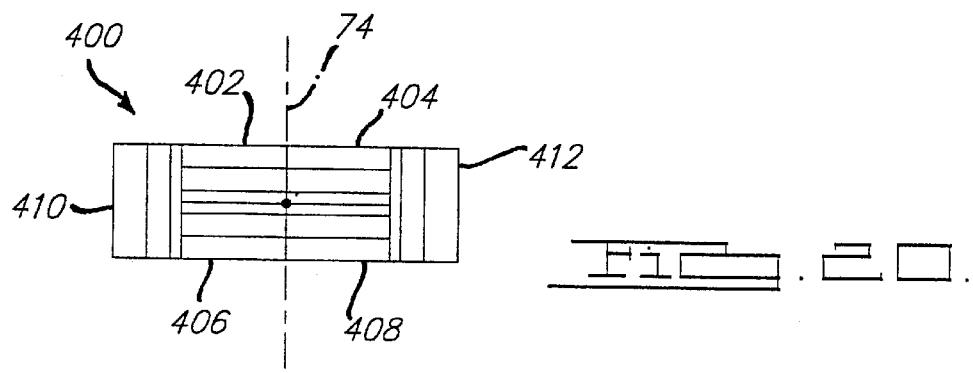
_FIG.20._
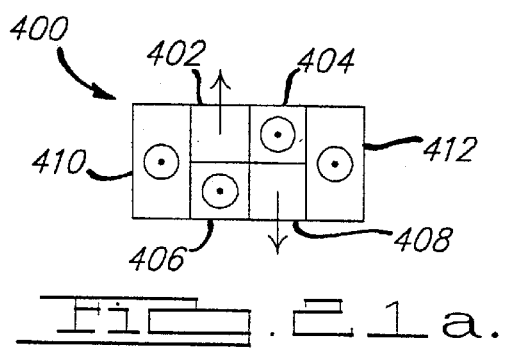 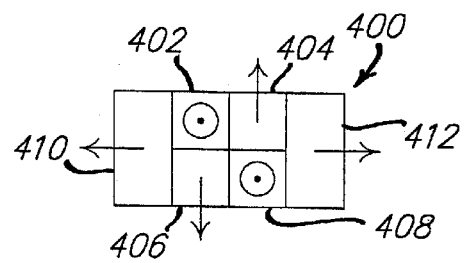
_FIG.21a._ _FIG.21b._
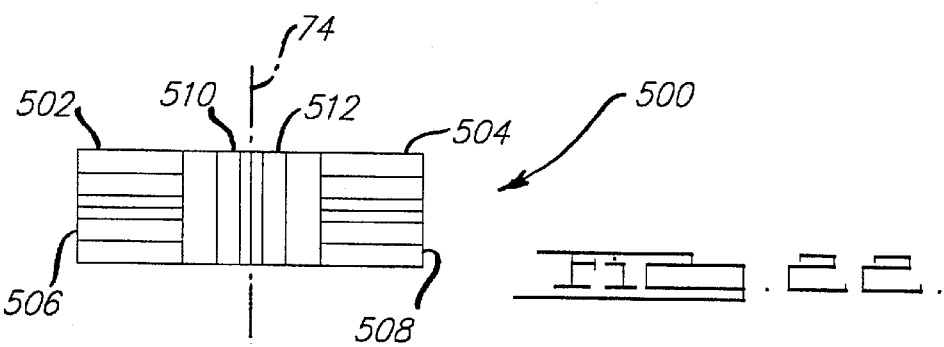
_FIG.22._
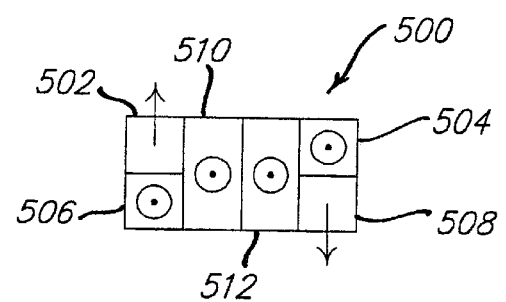 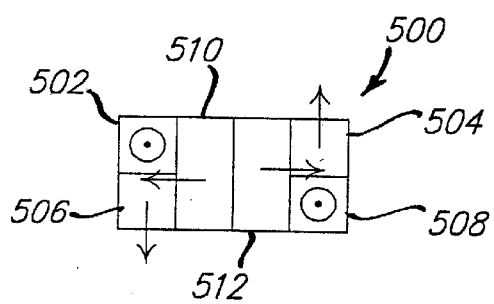
_FIG.23a._ _FIG.23b._

MULTI-STABLE THRUST VECTORING NOZZLE

TECHNICAL ART

The instant invention generally relates to fluidic thrust vectoring nozzles by which the direction of flow of a stream of primary gas is controlled by one or more control ports that operatively couple a source of pressure differential to one or more nozzle surfaces along which the stream of primary gas flows.

BACKGROUND OF THE INVENTION

Rockets, missiles, aircraft and other jet or rocket powered objects frequently use a thrust vectoring system for steering the object being thrusted. For example, a rocket or missile may be steered by controlling the orientation of a gimbaled nozzle., which can provide continuous control of the direction of the thrust vector over the range of travel of the nozzle assembly, but at the penalty of increased cost and complexity, and reduced reliability.

Alternately, the direction of thrust of a stream of exhaust gas exiting from a nozzle may be controlled fluidically by using either lateral control jets, attachment surfaces or a combination thereof. In accordance with the Coanda effect, a fluid stream traveling parallel and proximate to a surface can becomes attached thereto by the vacuum created between the fluid stream and the surface. A fluid stream may also be deflected by control jets by transfer of momentum from the control jets to the fluid stream. Furthermore, a fluid stream may be drawn towards a proximate surface by applying a vacuum to ports disposed along the surface.

U.S. Pat. No. 3,204,405 teaches a three-dimensional jet vectoring system wherein a thrust nozzle is provided with two orthogonal pairs of control jets along the surfaces thereof, and associated fluidic control valves that control the discharge of a portion of the exhaust stream from a reaction propulsion motor, to control the deflection of the thrust jet exiting from the nozzle. In the longitudinal thrust state, the thrust jet is centered within and not attached to the surfaces of the thrust nozzle, whereas in the oblique lateral thrust modes, the thrust jet becomes attached to the portion of the nozzle surface towards which the thrust jet is deflected by the associated control jet. In the longitudinal thrust state, the thrust jet is not attached to a surface and accordingly is subject to directional variation. Furthermore, the direction of the attached thrust jet in the oblique lateral thrust modes is subject to variation depending upon the relative strengths of the orthogonal control jets, and is accordingly sensitive to variations in the control jet signals.

U.S. Pat. No. 3,740,003 teaches a missile control system wherein bi-stable fluid amplifies control the discharge of a portion of an exhaust stream through a plurality of control jets at the discharge of a nozzle, wherein each of the plurality of control jets discharges in one of two opposed lateral directions. The thrust direction of the control jets is symmetric about the longitudinal thrust direction , and a separate thrust nozzle is required for longitudinal thrust.

U.S. Pat. No. 3,806,063 teaches a monostable thrust control system for a missile wherein the power stream is discharged as a free stream away from the surface of the missile to provide lateral control, or is discharged as an attached stream along the surface of the missile so that the power stream augments the thrust to the missile. In the lateral thrust mode, the free stream is not attached to any surface and is accordingly subject to directional variations. Moreover, a separate thrusting system is needed to provide the principal longitudinal thrust to the missile.

U.S. Pat. No. 4,018,384 teaches an attachment device for modifying the direction of flow of an exhaust nozzle by causing a portion of the exhaust gases exiting therefrom to become attached to the attachment surface that is oblique to the direction of exhaust flow, thereby providing an oblique lateral control flow, wherein different attachment surfaces are provided for different oblique lateral thrust directions. Ambient air is directed through a plurality of ports on the attachment surface to detach the attached flow therefrom. This invention provides for free stream flow in the longitudinal thrust mode, and provides for the redirection of only a portion of the exhaust flow in the oblique lateral thrust mode, accordingly providing limited lateral control authority.

U.S. Pat. 4,537,371 teaches a system for controlling small caliber guided projectiles wherein ambient air is discharged through diametrically opposed exhaust nozzles along the side of the projectile, wherein the distribution of flow between the exhaust nozzles is fluidcially controlled in accordance with the Coanda effect. The thrust direction of the control jets is symmetric about the direction of forward travel, and there is no provision for providing a pure longitudinal thrust state.

SUMMARY OF THE INVENTION

The instant invention overcomes the above-noted problems by providing a bi-stable thrust vectoring nozzle for discharging a stream of primary gas across first and second surfaces downstream of a nozzle throat, wherein the stream of primary gas attaches to either the first or second surface, responsive to a differential pressure or flow signal across respective control ports on the respective first and second surfaces, corresponding to respective first and second control states. The first and second surfaces are each opposed to one another and at a different angle with respect to the nozzle axis, i.e. the axis of the stream flow within the nozzle throat, so that the stream of primary gas discharged from the bi-stable thrust vectoring nozzle in the respective control states provides respective thrust vectors that are asymmetric with respect to the nozzle axis. Accordingly, with the nozzle axis substantially aligned with the longitudinal axis of an object to be thrusted, i.e. aligned with the corresponding direction of forward travel, in a first control state with the stream of primary gas attached to the first surface, the resulting thrust vector provides forward thrust to the object, whereas in a second control state with the stream of primary gas attached to the second surface aligned obliquely to the longitudinal axis of the object, the resulting thrust vector provides oblique lateral thrust to the object so as to provide combined directional control and forward thrust.

In the first control state, a pressure or outflow is applied to the one or more control ports on the second surface, and a vacuum is applied to the one or more control ports on the first surface, thereby causing the stream of primary gas exiting from the nozzle throat, if attached to the second surface, to deflect away from the second surface and become attached to the first surface, in accordance with the Coanda effect. A vacuum applied to the one or more control ports on the first surface further improves the attachment thereto.

In the second control state, a pressure or outflow is applied to the one or more control ports on the first surface, and a vacuum is applied to the one or more control ports on the second surface, thereby causing the stream of primary gas exiting from the nozzle throat, if attached to the first surface, to deflect away from the first surface and become attached to the second surface. A vacuum applied to the one or more control ports on the second surface further improves the attachment thereto.

Whereas preferably both a pressure or outflow is provided to the one or more control ports on the surface from which the stream of primary gas is to be deflected, i.e. the non-attached surface, and a vacuum is simultaneously provided to the one or more control ports on the surface to which the stream of primary gas is to become attached, i.e. the attached surface, it will be understood by one of ordinary skill in the art that the instant invention can be practiced with a single control signal, i.e. either a pressure applied to the control port on the non-attached surface or a vacuum applied to the control port on the attached surface.

A pair of bi-stable thrust vectoring nozzle elements may be combined to form a multi-stable thrust vectoring nozzle element that provides two longitudinal thrust states and two oblique lateral oppositely directed thrust states, wherein the respective first surfaces of the respective bi-stable thrust vectoring nozzle elements are oriented back-to-back. A pair of multi-stable thrust vectoring nozzle elements may be combined to form a first multi-stable thrust vectoring nozzle that provides additional oblique lateral thrust control states in orthogonal lateral directions. Furthermore, four multi-stable thrust vectoring nozzle elements may be combined to form a second multi-stable thrust vectoring nozzle that provides additional control states and independent control of thrust, pitch, yaw and roll of an object being thrusted thereby. The instant invention provides for either pure longitudinal thrust, or a combination of varying degrees of longitudinal thrust together with lateral thrust to provide oblique lateral thrust, or a combination of varying degrees of longitudinal thrust together with roll thrust to provide oblique roll thrust.

In general, a multi-stable thrust vectoring nozzle comprises a plurality of bi-stable thrust vectoring nozzle elements, each operated in one of two control states, the collective set of control states constituting a control mode, wherein the associated bi-stable thrust vectoring nozzle elements are oriented so that respective control modes provide for either pure longitudinal thrust, oblique yaw thrust in either of opposing yaw directions, oblique pitch thrust in either of opposing pitch directions, or oblique roll thrust in either of opposing roll directions. In one embodiment, the respective bi-stable thrust vectoring nozzle elements are arranged with the lateral axis of one or more central bi-stable thrust vectoring nozzle elements parallel to the yaw axis, and the lateral axis of a pair of surrounding bi-stable thrust vectoring nozzle elements parallel to the pitch axis. In another embodiment, the respective bi-stable thrust vectoring nozzle elements are arranged with the lateral axis of one or more central bi-stable thrust vectoring nozzle elements parallel to the pitch axis, and the lateral axis of one or more pairs of surrounding bi-stable thrust vectoring nozzle elements parallel to the yaw axis. In yet another embodiment, the respective bi-stable thrust vectoring nozzle elements are arranged in four groups, with lateral axes of the respective bi-stable thrust vectoring nozzle elements in the first and third groups parallel to one another and symmetric with respect to a central longitudinal axis, and the lateral axes of the respective bi-stable thrust vectoring nozzle elements in the second and fourth groups parallel to one another, in a direction that is linearly independent of the direction of the lateral axes of the first and third groups, and symmetric with respect to the central longitudinal axis.

The individual bi-stable thrust vectoring nozzle elements comprise a nozzle throat with first and second surfaces extending therefrom, wherein at least one of the first and second surfaces diverges from the longitudinal axis of the respective nozzle element. A symmetric nozzle element, wherein both surfaces diverge equally but in opposite directions from the longitudinal axis, provides for enhanced maneuverability but with decreased maximum longitudinal thrust. A pair of asymmetric nozzle elements, wherein one surface of each diverges in opposite directions from the longitudinal axis and the other surface of each are substantially aligned with the longitudinal axis, provides for increased maximum longitudinal thrust but with a reduced ratio of lateral to longitudinal thrust for lateral control modes.

The first and second surfaces are provided with control ports that are connected to respective sources of pressure and vacuum by a control valve in accordance with a particular control state. The sources of pressure or vacuum are preferably obtained by directing a portion of the missile exhaust stream through an ejector pump that provides a source of vacuum from the nozzle throat of the ejector pump and that provides a source of pressure from the diffuser of the ejector pump. Alternately, these sources may be obtained from separate mechanical pumps, or from ports arranged along the fuselage of the missile or missile engine at respective locations of pressure and vacuum.

The instant invention is suited for providing propulsive thrust and both lateral and roll control of a missile or aircraft, and can eliminate the need for moving control surfaces.

Accordingly, one object of the instant invention is to provide a multi-stable thrust vectoring nozzle wherein the direction of the thrust vector is fluidically controlled.

A further object of the instant invention is to provide for combined longitudinal thrust and directional control of an object being thrusted.

A yet further object of the instant invention is to provide a thrust vectoring nozzle that exhibits stable performance characteristics.

A yet further object of the instant invention is to provide a thrust vectoring nozzle that is reliable.

A yet further object of the instant invention is to provide a thrust vectoring nozzle that is economical.

In accordance with these objectives, one feature of the instant invention is a bi-stable thrust vectoring nozzle element wherein in a first control state, the thrust is directed in a longitudinal direction along the direction of forward motion of an object being thrusted, and in a second control state, the thrust is directed oblique to the longitudinal direction so as to provide a lateral component of thrust.

Another feature of the instant invention is the control of the bi-stable thrust vectoring nozzle element from sources of pressure and vacuum applied to control ports on the nozzle surfaces.

Yet another feature of the instant invention is a multi-stable thrust vectoring nozzle comprising a plurality of bi-stable thrust vectoring nozzle elements so as to provide additional thrust control states.

The specific features of the instant invention provide a number of associated advantages. One advantage of the instant invention with respect to the prior art is a thrust vectoring nozzle that provides either forward thrust or a combination of forward and lateral thrust.

Another advantage of the instant invention is a thrust vectoring nozzle that provides a combination of forward and roll thrust.

Yet another advantage of the instant invention is that the direction of thrust is controlled without requiring moving parts exposed to high temperature exhaust gases, so as to reduce cost and increase reliability.

Yet another advantage of the instant invention is increased stability resulting from the attachment of the stream of primary gas to surface having fixed geometry so that the resulting thrust vector can be repeatably directed in a predetermined direction.

Yet another advantage of the instant invention is that the multi-stable thrust vectoring nozzle thereof provides longitudinal, lateral and roll thrust control modes thereby enabling an aircraft or missile to be propelled and controlled without any external moving propulsion or control surfaces which provides for reduced radar cross section.

These and other objects, features, and advantages of the instant invention will be more fully understood after reading the following detailed description of the preferred embodiment with reference to the accompanying drawings and viewed in accordance with the appended claims. While this description will illustrate the application of the instant invention in a missile, it will be understood by one with ordinary skill in the art that the instant invention can also be applied to any application requiring directional control of thrust.

BRIEF DESCRIPTION OF THE DRAWINGS

FIG. 4b illustrates a cross-sectional view of a first multi-stable thrust vectoring nozzle element in a control state providing an axial thrust vector.

FIG. 4c illustrates a cross-sectional view of a second multi-stable thrust vectoring nozzle element in a control state providing an axial thrust vector.

FIG. 6a illustrates an end view of a first multi-stable thrust vectoring nozzle in a control state providing a rightward thrust vector.

FIG. 6b illustrates a cross-sectional view of a first multi-stable thrust vectoring nozzle element in a control state providing a rightward thrust vector.

FIG. 6c illustrates a cross-sectional view of a second multi-stable thrust vectoring nozzle element in a control state providing a rightward thrust vector.

FIG. 7a illustrates an end view of a first multi-stable thrust vectoring nozzle in a control state providing a leftward thrust vector.

FIG. 7b illustrates a cross-sectional view of a first multi-stable thrust vectoring nozzle element in a control state providing a leftward thrust vector.

FIG. 7c illustrates a cross-sectional view of a second multi-stable thrust vectoring nozzle element in a control state providing a leftward thrust vector.

FIG. 8a illustrates an end view of a first multi-stable thrust vectoring nozzle in a control state providing an upward thrust vector.

FIG. 8b illustrates a cross-sectional view of a first multi-stable thrust vectoring nozzle element in a control state providing an upward thrust vector.

FIG. 8c illustrates a cross-sectional view of a second multi-stable thrust vectoring nozzle element in a control state providing an upward thrust vector.

FIG. 9a illustrates an end view of a first multi-stable thrust vectoring nozzle in a control state providing a downward thrust vector.

FIG. 9b illustrates a cross-sectional view of a first multi-stable thrust vectoring nozzle element in a control state providing a downward thrust vector.

FIG. 9c illustrates a cross-sectional view of a second multi-stable thrust vectoring nozzle element in a control state providing a downward thrust vector.

FIGS. 19*a–p* schematically illustrate a set of thrust states of the third multi-stable thrust vectoring nozzle illustrated in FIG. 18.

FIG. 20 illustrates an end view of a fourth multi-stable thrust vectoring nozzle comprising six bi-stable thrust vectoring nozzle elements.

FIGS. 21*a–b* schematically illustrate several oblique roll thrust states of the fourth multi-stable thrust vectoring nozzle illustrated in FIG. 20.

FIG. 22 illustrates an end view of a fifth multi-stable thrust vectoring nozzle comprising six bi-stable thrust vectoring nozzle elements.

FIGS. 23*a–f* schematically illustrate a set of thrust states of the fifth multi-stable thrust vectoring nozzle illustrated in FIG. 22.

DETAILED DESCRIPTION OF THE PREFERRED EMBODIMENT(S)

Figure 1:
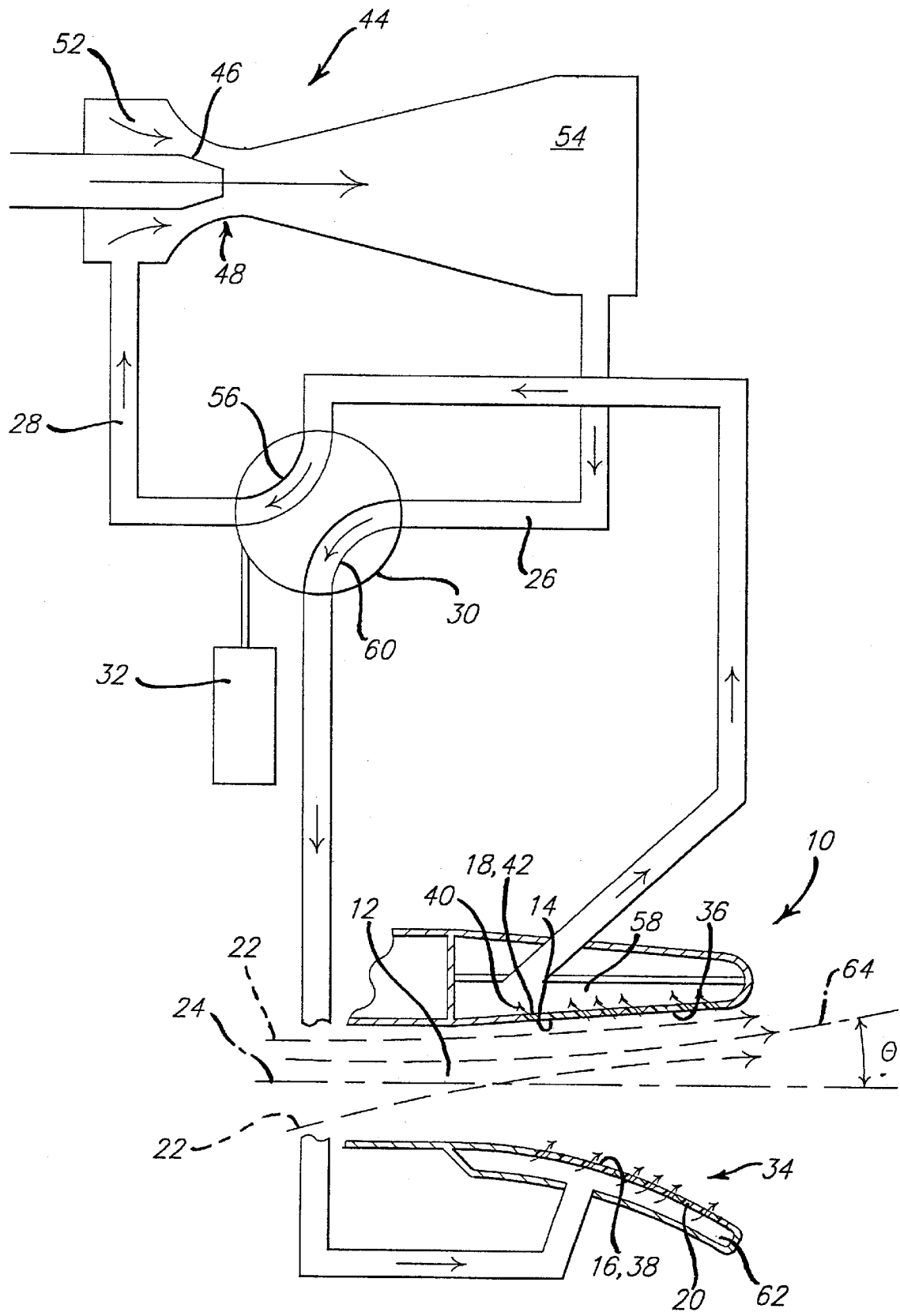
FIG. 1 illustrates a bi-stable thrust vectoring nozzle with a stream of primary gas attached to a first surface responsive to a control valve in a first state.

Referring to FIG. 1, a bi-stable thrust vectoring nozzle 10 comprises a nozzle throat 12 and first 14 and second 16 surfaces downstream of the nozzle throat 12, wherein the first surface 14 is provided with at least one first port 18 and the second surface 16 is provided with at least one second port 20. A stream of primary gas 22 flowing from the nozzle throat 12 along a nozzle axis 24 attaches to either the first 14 or second 16 surface responsive to a differential pressure or differential flow between or across the first 18 and second 20 ports. A source of pressure 26 and a source of vacuum 28 are operatively coupled to the first 18 and second 20 ports by a 4-way control valve 30 controlled by an actuator 32, for example by an electric, pneumatic or hydraulic actuator. The source of pressure 26 can be any source of fluid, including a gas or a liquid, capable of providing the outflow of secondary gas 34 necessary to deflect the stream of primary gas 22 away from one of the first 14 and second 16 surfaces to which the stream of primary gas 22 is attached, i.e. the attached surface 36, and towards the other of the first 14 and second 16 surfaces, i.e. the non-attached surface 38, so that the stream of primary gas 22 becomes attached to the non-attached surface 38. The source of vacuum 28 can be any source of vacuum capable of pumping a portion of the stream of primary gas 22 so as to create an inflow 40 through the port 42 on the attached surface 36 as necessary to maintain the attachment of the stream of primary gas 22 to the attached surface 36. Whereas the instant invention may be operated exclusively with either only source of pressure 26 or a source of vacuum 28, preferable both a source of pressure 26 and a source of vacuum 28 are provided for simultaneously applying a pressure to the at least one port 18, 20 on one of the first 14 and second 16 surfaces and applying a vacuum to the at least one port 20, 18 on the other of the second 16 and first 14 surfaces. For example, in an ejector pump 44, a stream of fluid, such as a portion of the stream of primary gas 22 or engine exhaust gas, flows through at least one jet 46 directed into the throat 48 of a nozzle 50 creating a region of vacuum 52 upstream of the throat 48 and a region of pressurization 54 downstream of the throat 48.

Referring to FIG. 1, the control valve 30 in a first state couples the source of vacuum 28 via a first valve flow path 56 to a first plenum 58 in fluid communication with the at least one first port 18 and couples the source of pressure 26 via a second flow path 60 to a second plenum 62 in fluid communication with the at least one second port 20, causing the stream of primary gas 22 to attach to the first surface 14, thereby discharging from the bi-stable thrust vectoring nozzle 10 in a direction along a first discharge axis 64.

Figure 2:
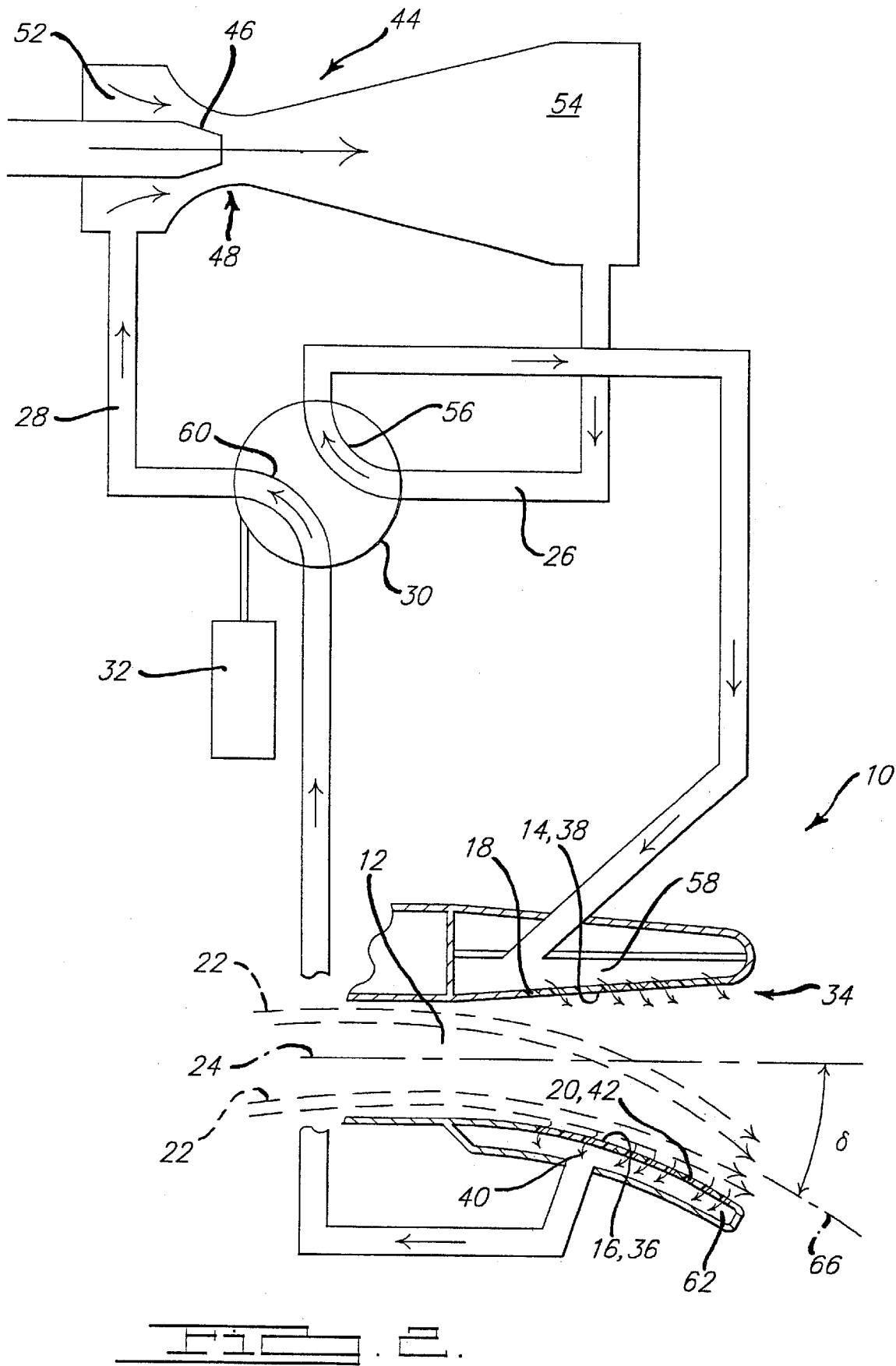
FIG. 2 illustrates a bi-stable thrust vectoring nozzle with a stream of primary gas attached to a second surface responsive to a control valve in a second state.

Referring to FIG. 2, the control valve 30 in a second state couples the source of pressure 26 via the first valve flow path 56 to the first plenum 58 in fluid communication with the at least one first port 18 and couples the source of vacuum 28 via the second flow path 60 to the second plenum 62 in fluid communication with the at least one second port 20, causing the stream of primary gas 22 to deflect away from the first surface 14 and to attach to the second surface 16, thereby discharging from the bi-stable thrust vectoring nozzle 10 in a direction along a second discharge axis 66, wherein the angle θ between the first discharge axis 64 and the nozzle axis 24 is substantially different from the angle γ between the second discharge axis 66 and the nozzle axis 24. Preferably, the first discharge axis 64 is substantially aligned with the nozzle axis 24 and the second discharge axis 66 is oblique to the nozzle axis 24, as illustrated in FIGS. 1 and 2.

Figure 3:
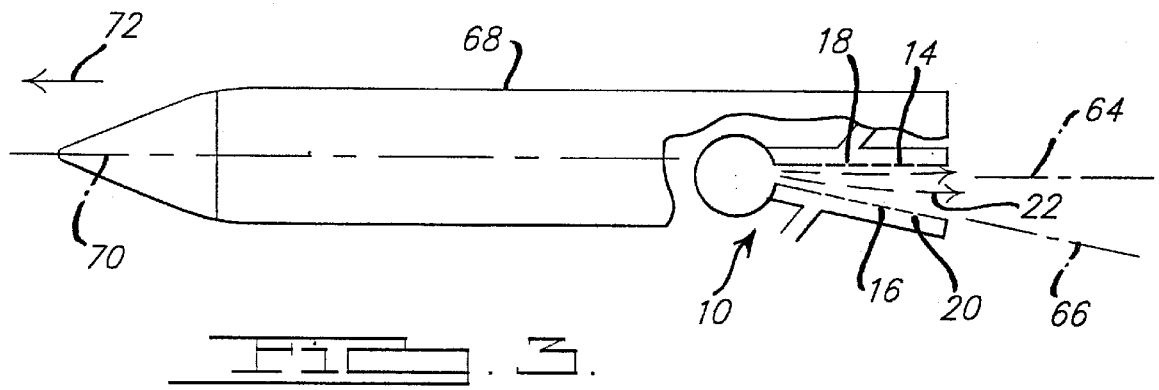
FIG. 3 illustrates a missile incorporating a bi-stable thrust vectoring nozzle for axial thrust and steering.

Referring to FIG. 3, a bi-stable thrust vectoring nozzle 10 is installed in an object to be thrusted, for example a missile 68, having a longitudinal axis 70 along which the missile travels when moving in a forward direction 72, wherein the first discharge axis 64 of the bi-stable thrust vectoring nozzle 10 is substantially aligned with the longitudinal axis 70 of the missile 68. Accordingly, when the stream of primary gas 22 is attached to the first surface 14, the discharge of the stream of primary gas 22 from the bi-stable thrust vectoring nozzle 10 provides for axial thrust in the forward direction 72. When the stream of primary gas 22 is attached to the second surface 16, the discharge of the stream of primary gas 22 from the bi-stable thrust vectoring nozzle 10 provides for oblique lateral thrust so as to provide for pitch or yaw motion of the missile 68 responsive to the associated lateral component of thrust.

The bi-stable thrust vectoring nozzle 10 provides for combined axial thrust and lateral control in one lateral vector direction in accordance with the direction in which the second surface 16 expands. Two bi-stable thrust vectoring nozzles 10 may be combined with respective first surfaces 14 back-to-back so as to provide for combined axial thrust and lateral control in two lateral and opposing vector directions, so as to form a multi-stable thrust vectoring nozzle.

Figure 4A:
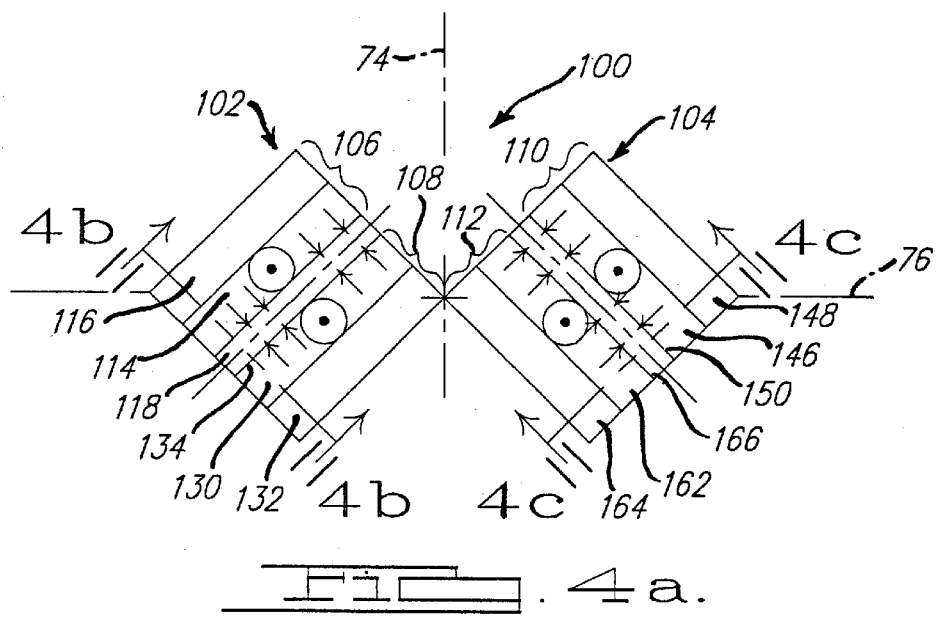
FIG. 4a illustrates an end view of a first multi-stable thrust vectoring nozzle in a control state providing an axial thrust vector.

Referring to FIGS. 4*a–c*, a multi-stable trust vectoring nozzle 100 comprises first 102 and second 104 multi-stable trust vectoring nozzle elements. The first multi-stable trust vectoring nozzle element 102 comprises first 106 and second 108 bi-stable thrust vectoring nozzle elements, each providing either axial thrust or oblique lateral thrust in respective lateral directions that are opposite to one another. Similarly, the second multi-stable trust vectoring nozzle element 104 comprises third 110 and fourth 112 bi-stable thrust vectoring nozzle elements, each providing either axial thrust or oblique lateral thrust in respective lateral directions that are opposite to one another and orthogonal to the respective lateral directions of the first multi-stable trust vectoring nozzle element 102. The lateral directions of the first 102 and second 104 multi-stable trust vectoring nozzle elements are preferably each oriented at 45 degrees with respect to the vertical (yaw) 74 and horizontal (pitch) 76 axes of the object being thrusted.

The first bi-stable thrust vectoring nozzle element 106 comprises a first nozzle throat 114, and a first outer surface 116 and a first inner surface 118 each extending therefrom. At least one first outer port 120 operatively couples the first outer surface 116 to a first outer plenum 122 that is in fluid communication via a first control valve 124 with either a source of pressure 26 or a source of vacuum 28, depending upon the associated operating state of the first control valve 124. At least one first inner port 126 operatively couples the first inner surface 118 to a first inner plenum 128 that is in fluid communication with either a source of vacuum 28 or a source of pressure 26 via the first control valve 124, depending upon the associated operating state of the first control valve 124, which when communicating the source of pressure 26 to one of the first outer 120 or inner 126 ports, simultaneously communicates the source of vacuum 28 to the other of the first inner 126 or outer 120 ports.

The second bi-stable thrust vectoring nozzle element 108 comprises a second nozzle throat 130, and a second outer surface 132 and a second inner surface 134 each extending therefrom. At least one second outer port 136 operatively couples the second outer surface 132 to a second outer plenum 138 that is in fluid communication via a second control valve 140 with either a source of pressure 26 or a source of vacuum 28, depending upon the associated operating state of the second control valve 140. At least one second inner port 142 operatively couples the second inner surface 134 to a second inner plenum 144 that is in fluid communication with either a source of vacuum 28 or a source of pressure 26 via the second control valve 140, depending upon the associated operating state of the second control valve 140, which when communicating the source of pressure 26 to one of the second outer 136 or inner 142 ports, simultaneously communicates the source of vacuum 28 to the other of the second inner 142 or outer 136 ports.

The third bi-stable thrust vectoring nozzle element 110 comprises a third nozzle throat 146, and a third outer surface 148 and a third inner surface 150 each extending therefrom. At least one third outer port 152 operatively couples the third outer surface 148 to a third outer plenum 154 that is in fluid communication via a third control valve 156 with either a source of pressure 26 or a source of vacuum 28, depending upon the associated operating state of the third control valve 156. At least one third inner port 158 operatively couples the third inner surface 150 to a third inner plenum 160 that is in fluid communication with either a source of vacuum 28 or a source of pressure 26 via the third control valve 156, depending upon the associated operating state of the third control valve 156, which when communicating the source of pressure 26 to one of the third outer 152 or inner 158 ports, simultaneously communicates the source of vacuum 28 to the other of the third inner 158 or outer 152 ports.

The fourth bi-stable thrust vectoring nozzle element 112 comprises a fourth nozzle throat 162, and a fourth outer surface 164 and a fourth inner surface 166 each extending therefrom. At least one fourth outer port 168 operatively couples the fourth outer surface 164 to a fourth outer plenum 170 that is in fluid communication via a fourth control valve 172 with either a source of pressure 26 or a source of vacuum 28, depending upon the associated operating state of the fourth control valve 172. At least one fourth inner port 174 operatively couples the fourth inner surface 166 to a fourth inner plenum 176 that is in fluid communication with either a source of vacuum 28 or a source of pressure 26 via the fourth control valve 172, depending upon the associated operating state of the fourth control valve 172, which when communicating the source of pressure 26 to one of the fourth outer 168 or inner 174 ports, simultaneously communicates the source of vacuum 28 to the other of the fourth inner 174 or outer 168 ports.

Figure 5:
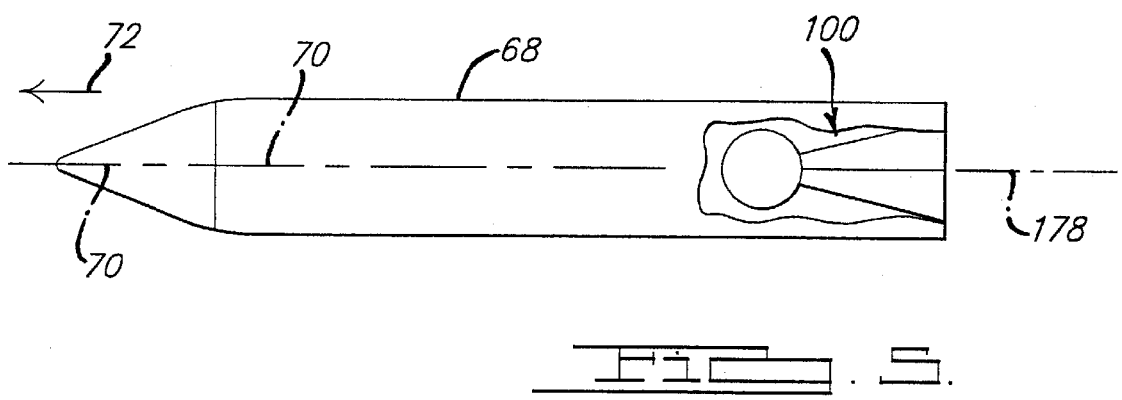
FIG. 5 illustrates a missile incorporating a multi-stable thrust vectoring nozzle for axial thrust and steering.

Referring to FIG. 5, a first multi-stable thrust vectoring nozzle 100 is incorporated in a missile 68 having a longitudinal axis 70 aligned with the forward direction 72 of travel, and with the axis 178 of the first multi-stable thrust vectoring nozzle 100. Accordingly, when the first multi-stable thrust vectoring nozzle 100 is operated in a control state providing a net axial thrust vector, as illustrated in FIGS. 4*a–c*, the direction of the axial thrust vector is aligned with the longitudinal axis 70 of the missile 68.

Referring to FIGS. 4*b*, 6*b* and 9*b*, the first control valve 124 in a first state is positioned so as to place the source of vacuum 28 in communication with the first inner port 126 on the first inner surface 118 and the source of pressure 26 in communication with the first outer port 120 on the first outer surface 116, so as to cause a first stream of primary gas 180 to attach to the first inner surface 118.

Referring to FIGS. 7*b* and 8*b*, the first control valve 124 in a second state is positioned so as to place the source of pressure 26 in communication with the first inner port 126 on the first inner surface 118 and the source of vacuum 28 in communication with the first outer port 136 on the first outer surface 116, so as to cause a first stream of primary gas 180 to attach to the first outer surface 116.

Referring to FIGS. 4*b*, 7*b* and 8*b*, the second control valve 140 in a first state is positioned so as to place the source of vacuum 28 in communication with the second inner port 142 on the second inner surface 134 and the source of pressure 26 in communication with the second outer port 136 on the second outer surface 132, so as to cause a second stream of primary gas 182 to attach to the second inner surface 134.

Referring to FIGS. 6*b* and 9*b*, the second control valve 140 in a second state is positioned so as to place the source of pressure 26 in communication with the second inner port 142 on the second inner surface 134 and the source of vacuum 28 in communication with the second outer port 120 on the second outer surface 132, so as to cause a second stream of primary gas 182 to attach to the second outer surface 132.

Referring to FIGS. 4c, 7c and 9c, the third control valve 156 in a first state is positioned so as to place the source of vacuum 28 in communication with the third inner port 158 on the third inner surface 150 and the source of pressure 26 in communication with the third outer port 152 on the third outer surface 148, so as to cause a third stream of primary gas 184 to attach to the third inner surface 150.

Referring to FIGS. 6c and 8c, the third control valve 156 in a second state is positioned so as to place the source of pressure 26 in communication with the third inner port 158 on the third inner surface 150 and the source of vacuum 28 in communication with the third outer port 152 on the third outer surface 148, so as to cause a third stream of primary gas 184 to attach to the third outer surface 148.

Referring to FIGS. 4c, 6c and 8c, the fourth control valve 172 in a first state is positioned so as to place the source of vacuum 28 in communication with the fourth inner port 174 on the fourth inner surface 166 and the source of pressure 26 in communication with the fourth outer port 168 on the fourth outer surface 164, so as to cause a fourth stream of primary gas 186 to attach to the fourth inner surface 166.

Referring to FIGS. 7c and 9c, the fourth control valve 172 in a second state is positioned so as to place the source of pressure 26 in communication with the fourth inner port 174 on the fourth inner surface 166 and the source of vacuum 28 in communication with the fourth outer port 168 on the fourth outer surface 164, so as to cause a fourth stream of primary gas 186 to attach to the fourth outer surface 164.

Accordingly, the combination of the thrust vectors from the first 180, second 182, third 184, and fourth 186 streams of primary gas respectively attached to the first 118, second 134, third 150 and fourth 166 inner surfaces in accordance with FIGS. 4a–c provides for an axial thrust vector. Moreover, the combination of the thrust vectors from the first 180, second 182, third 184, and fourth 186 streams of primary gas respectively attached to the first 118 and fourth 166 inner surfaces and the second 132 and third 148 outer surfaces in accordance with FIGS. 6a–c provides for a rightward thrust vector. Moreover, the combination of the thrust vectors from the first 180, second 182, third 184, and fourth 186 streams of primary gas respectively attached to the first 116 and fourth 164 outer surfaces and the second 134 and third 150 inner surfaces in accordance with FIGS. 7a–c provides for a leftward thrust vector. Moreover, the combination of the thrust vectors from the first 180, second 182, third 184, and fourth 186 streams of primary gas respectively attached to the first 116 and third 148 outer surfaces and the second 134 and fourth 166 inner surfaces in accordance with FIGS. 8a–c provides for a upward thrust vector. Moreover, the combination of the thrust vectors from the first 180, second 182, third 184, and fourth 186 streams of primary gas respectively attached to the first 118 and third 150 inner surfaces and the second 132 and fourth 164 outer surfaces in accordance with FIGS. 9a–c provides for a upward thrust vector.

Referring to FIGS. 6a–c and 7a–c, one problem with the arrangement of the first multi-stable thrust vectoring nozzle 100 is a coupling between yaw and roll control modes, wherein the rightward and leftward oblique lateral thrust states also create associated respective counterclockwise and clockwise oblique roll thrust components. As described hereinbelow, these control states may be decoupled, for example, by providing additional multi-stable thrust vectoring nozzle elements to the associated multi-stable thrust vectoring nozzle combination or by rearranging the positions of the associated bi-stable thrust vectoring nozzle elements.

Figure 10A:
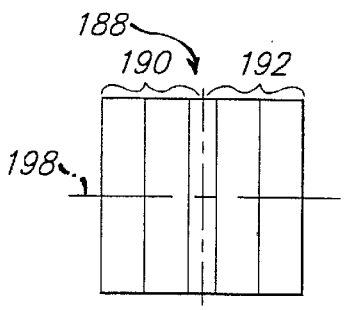
FIG. 10a illustrates an end view of a multi-stable thrust vectoring nozzle element showing the lateral thrust axis.
Figure 10B:
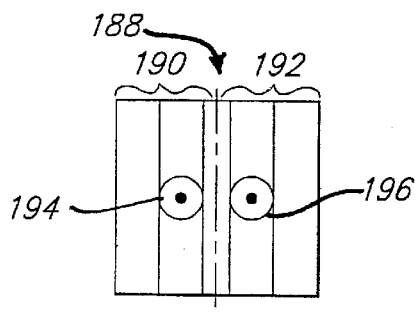
FIG. 10b illustrates an end view of a multi-stable thrust vectoring nozzle element in a maximum thrust longitudinal thrust state.

Referring to FIG. 10a, a multi-stable thrust vectoring nozzle element 188 similar to either the first (left) 102 and second (right) 104 multi-stable thrust vectoring nozzle elements described herein above and comprising first 190 and second 192 bi-stable thrust vectoring nozzle elements, exhibits four operating states, including a maximum thrust longitudinal thrust state as illustrated in FIGS. 10b wherein the respective first 194 and second 196 streams of primary gas are attached to the respective inner surfaces of the first 190 and second 192 bi-stable thrust vectoring nozzle elements; a first (left) oblique lateral thrust state illustrated in FIG. 10c wherein the respective first 194 and second 196 streams of primary gas are attached to the respective outer and inner surfaces of the first 190 and second 192 bi-stable thrust vectoring nozzle elements; a second (right) oblique lateral thrust state illustrated in 10d wherein the respective first 194 and second 196 streams of primary gas are attached to the respective inner and outer surfaces of the first 190 and second 192 bi-stable thrust vectoring nozzle elements; and a reduced thrust longitudinal thrust state illustrated in FIG. 10e wherein the respective first 194 and second 196 streams of primary gas are attached to the respective outer surfaces of the first 190 and second 192 bi-stable thrust vectoring nozzle elements. The two oblique lateral thrust states provide associated lateral components of thrust in opposite directions along and centered about a lateral axis 198.

Figure 11:
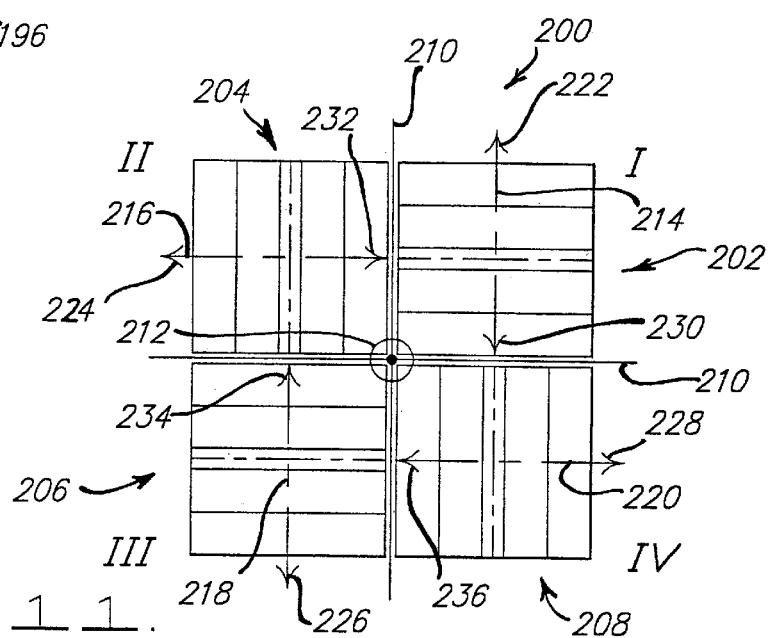
FIG. 11 illustrates an end view of a second multi-stable thrust vectoring nozzle showing the lateral thrust axes and respective inboard and outboard lateral thrust directions for each of the associated four multi-stable thrust vectoring nozzle elements.

Referring to FIG. 11, a second multi-stable thrust vectoring nozzle 200 comprises four multi-stable thrust vectoring nozzle elements 202, 204, 206 and 208 each adjacent to one another and respectively oriented in separate quadrants I, II, III, and IV of a local nozzle coordinate system 210 centered about the nozzle axis 212, wherein the respective lateral axes 214, 216, 218 and 220 of respective multi-stable thrust vectoring nozzle elements 202, 204, 206 and 208 are oriented so that the lateral axes of diametrically opposed multi-stable thrust vectoring nozzle elements, e.g. 202 and 206 or 204 and 208, are parallel to one another, and the axes of adjacent multi-stable thrust vectoring nozzle elements, e.g. 202 and 204, 204 and 206, 206 and 208, or 208 and 202 are independently directed and preferably perpendicular to one another. Alternately, with the first multi-stable thrust vectoring nozzle elements 202 located in the first quadrant I, the successive multi-stable thrust vectoring nozzle elements 204, 206 and 208 correspond to rotations of the first multi-stable thrust vectoring nozzle elements 202 about the nozzle axis 212 by 90, 180 and 270 degrees respectively. Accordingly, the respective multi-stable thrust vectoring nozzle elements 202, 204, 206 and 208 in the second multi-stable thrust vectoring nozzle 200 each have a respective outboard lateral thrust direction 222, 224, 226 and 228 and a respective inboard lateral thrust direction 230, 232, 234 and 236.

Referring to FIGS. 12a–c, 13a–b, 14a–b, 15a–d, 16a–b, and 17a–d, the second multi-stable thrust vectoring nozzle 200 is preferably oriented with the local nozzle coordinate system 210 at substantially 45 degrees relative to the vertical (yaw) 74 and horizontal (pitch) 76 axes of the object being thrusted. Each of the multi-stable thrust vectoring nozzle elements 202, 204, 206 and 208 can be operated in four different independent thrust states as illustrated in FIGS. 10b–d. Accordingly, the set of four multi-stable thrust vectoring nozzle elements 202, 204, 206 and 208 in the second multi-stable thrust vectoring nozzle 200 can collectively be operated in a maximum of $4^4$=256 independent thrust states, a subset of which are illustrated in FIGS. 12a–c, 13a–b, 14a–b, 15a–d, 16a–b, and 17a–d.

Figure 12A:
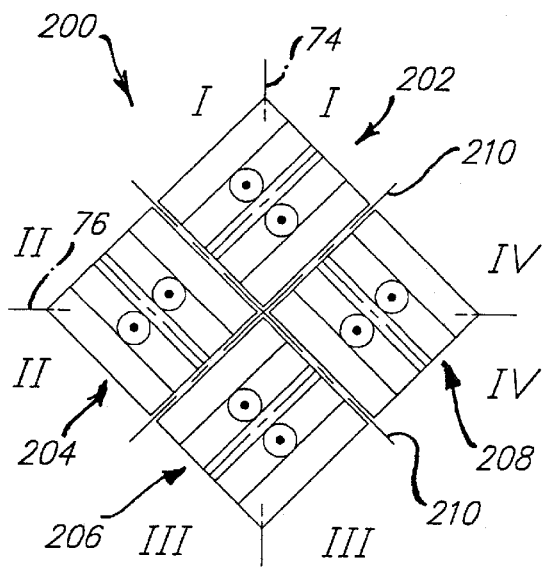
FIG. 12a illustrates an end view of a second multi-stable thrust vectoring nozzle in a maximum thrust longitudinal thrust state.
Figure 12B:
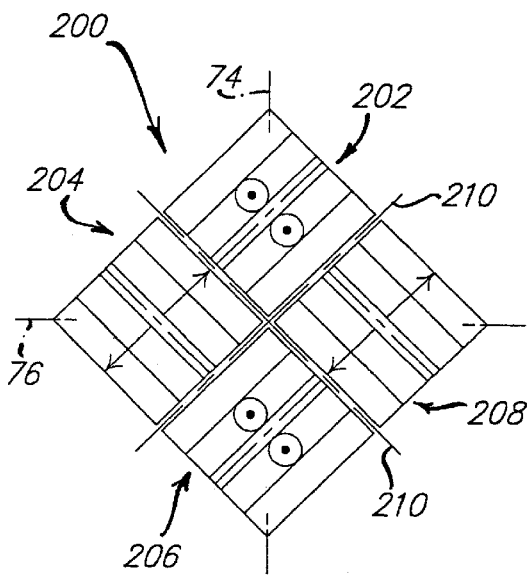
FIG. 12b illustrates an end view of a second multi-stable thrust vectoring nozzle in an intermediate thrust longitudinal thrust state.
Figure 12C:
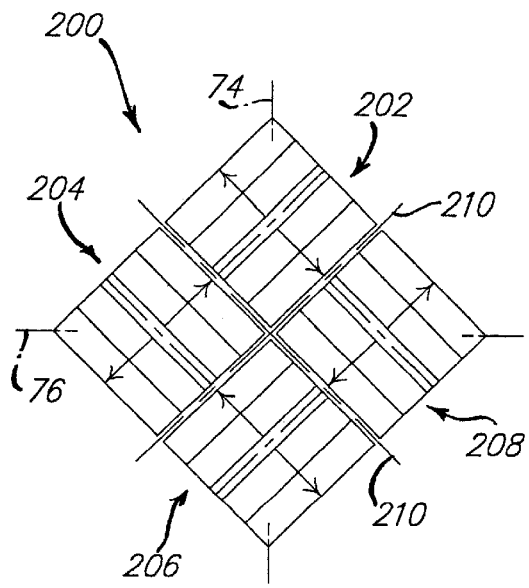
FIG. 12c illustrates an end view of a second multi-stable thrust vectoring nozzle in a reduced thrust longitudinal thrust state.

Referring to FIG. 12a, in a maximum thrust longitudinal thrust state, each of the multi-stable thrust vectoring nozzle elements 202, 204, 206 and 208 are operated in a maximum thrust longitudinal thrust state as illustrated in FIG. 10b. Referring to FIG. 12b, in an intermediate thrust longitudinal thrust state, one pair of opposing multi-stable thrust vectoring nozzle elements, e.g. 202 and 206, are each operated in a maximum thrust longitudinal thrust state as illustrated in FIG. 10b, and the other pair of opposing multi-stable thrust vectoring nozzle elements, e.g. 204 and 208, are each operated in a reduced thrust longitudinal thrust state as illustrated in FIG. 10e. Referring to FIG. 12c, in a minimum thrust longitudinal thrust state, each of the multi-stable thrust vectoring nozzle elements 202, 204, 206 and 208 are operated in a reduced thrust longitudinal thrust state.

Figure 10C:
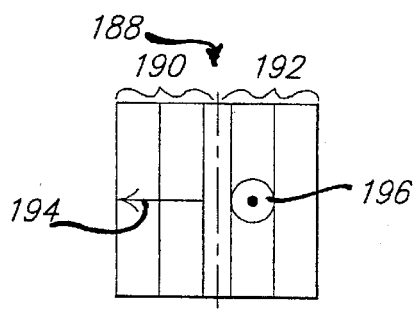
FIG. 10c illustrates an end view of a multi-stable thrust vectoring nozzle element in a first oblique lateral thrust state.
Figure 10D:
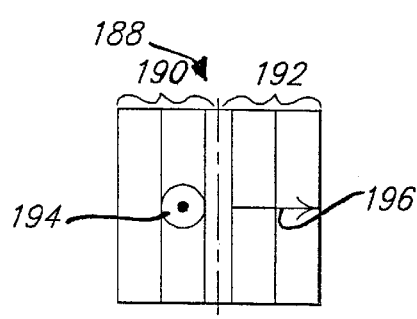
FIG. 10d illustrates an end view of a multi-stable thrust vectoring nozzle element in a second oblique lateral thrust state.
Figure 10E:
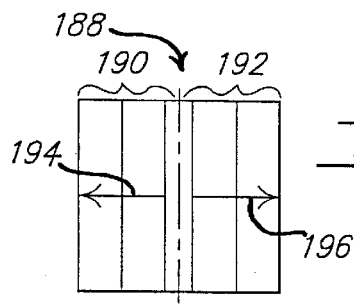
FIG. 10e illustrates an end view of a multi-stable thrust vectoring nozzle element in a reduced thrust longitudinal thrust state.
Figure 13A:
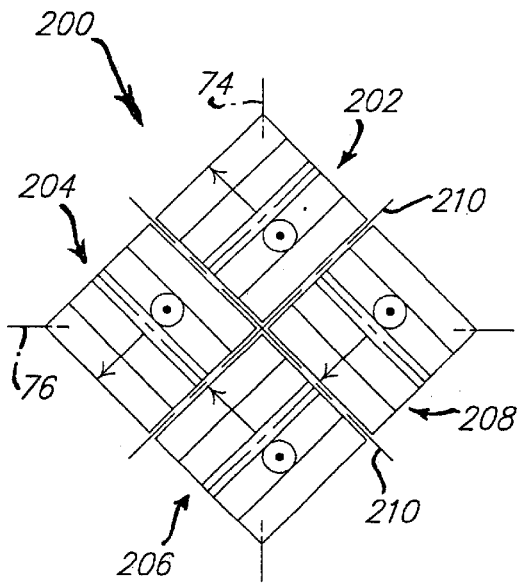
FIG. 13a illustrates an end view of a second multi-stable thrust vectoring nozzle in a leftward (180°) thrust oblique lateral thrust state.
Figure 13B:
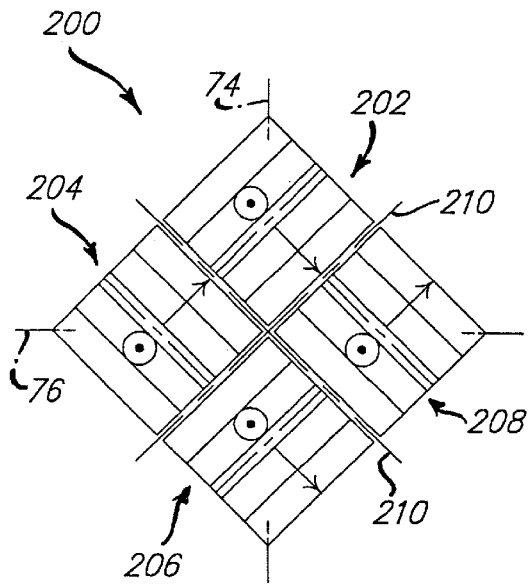
FIG. 13b illustrates an end view of a second multi-stable thrust vectoring nozzle in a rightward (0°) thrust oblique lateral thrust state.

Referring to FIG. 13a, in a leftward (180°) thrust oblique lateral thrust state, multi-stable thrust vectoring nozzle elements 202 and 204 are each operated in an outboard oblique lateral thrust state, as illustrated in FIGS. 10c or 10d; and multi-stable thrust vectoring nozzle elements 206 and 208 are each operated in an inboard oblique lateral thrust state, as illustrated in FIGS. 10c or 10d. Referring to FIG. 13b, in a rightward (0°) thrust oblique lateral thrust state, multi-stable thrust vectoring nozzle elements 202 and 204 are each operated in an inboard oblique lateral thrust state, and multi-stable thrust vectoring nozzle elements 206 and 208 are each operated in an outboard oblique lateral thrust state.

Figure 14A:
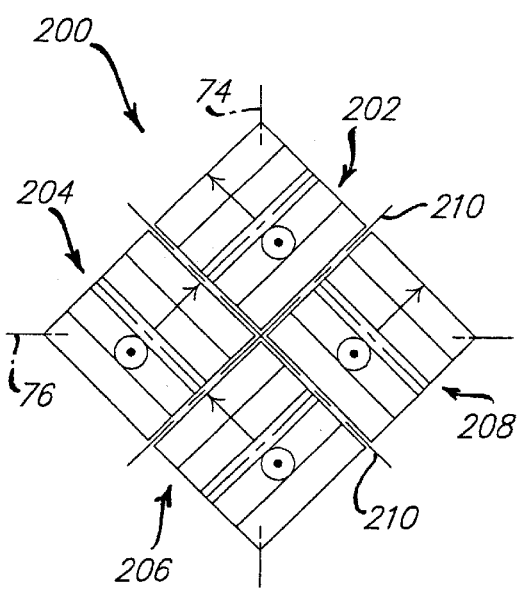
FIG. 14a illustrates an end view of a second multi-stable thrust vectoring nozzle in a upward (90°) thrust oblique lateral thrust state.
Figure 14B:
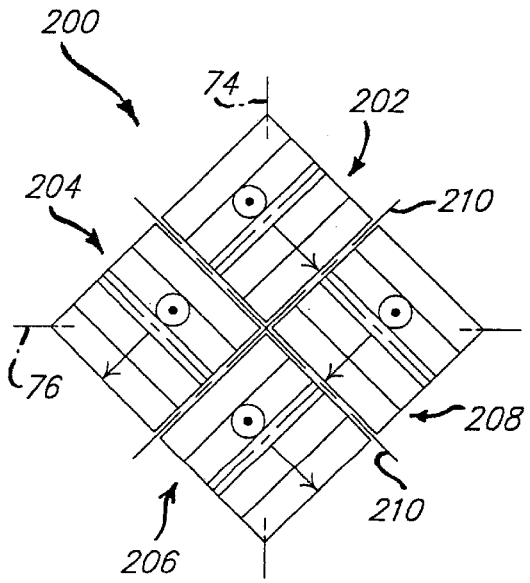
FIG. 14b illustrates an end view of a second multi-stable thrust vectoring nozzle in a downward (270°) thrust oblique lateral thrust state.

Referring to FIG. 14a, in an upward (90°) thrust oblique lateral thrust state, multi-stable thrust vectoring nozzle elements 202 and 208 are each operated in an outboard oblique lateral thrust state, and multi-stable thrust vectoring nozzle elements 204 and 206 are each operated in an inboard oblique lateral thrust state. Referring to FIG. 14b, in a downward (270°) thrust oblique lateral thrust state, multi-stable thrust vectoring nozzle elements 202 and 208 are each operated in an inboard oblique lateral thrust state, and multi-stable thrust vectoring nozzle elements 204 and 206 are each operated in an outboard oblique lateral thrust state.

Figure 15A:
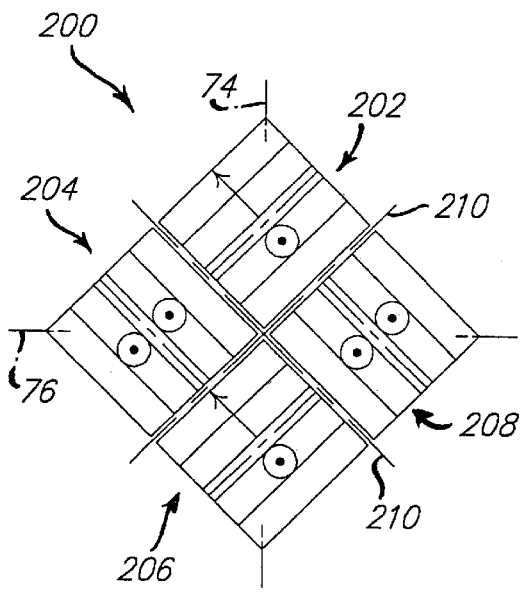
FIG. 15a illustrates an end view of a second multi-stable thrust vectoring nozzle in a 135° thrust oblique lateral thrust state.
Figure 15B:
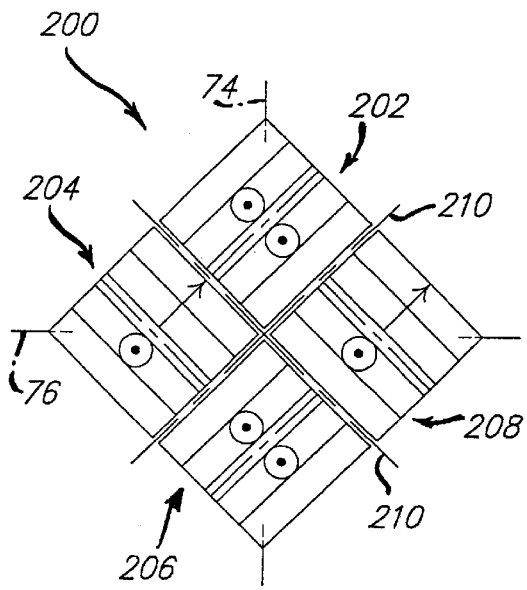
FIG. 15b illustrates an end view of a second multi-stable thrust vectoring nozzle in a 45° thrust oblique lateral thrust state.
Figure 15C:
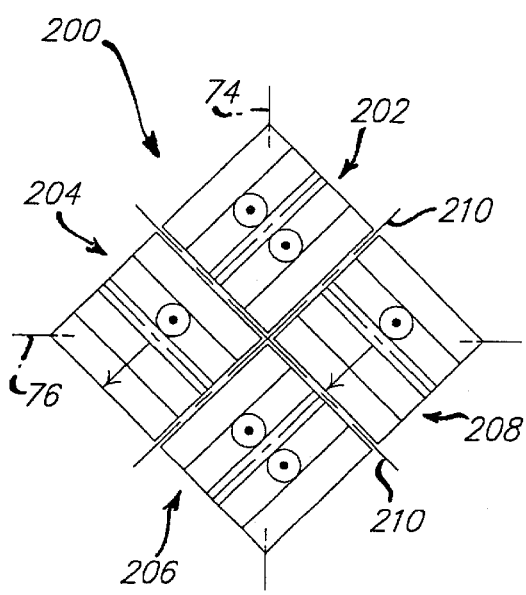
FIG. 15c illustrates an end view of a second multi-stable thrust vectoring nozzle in a 225° thrust oblique lateral thrust state.
Figure 15D:
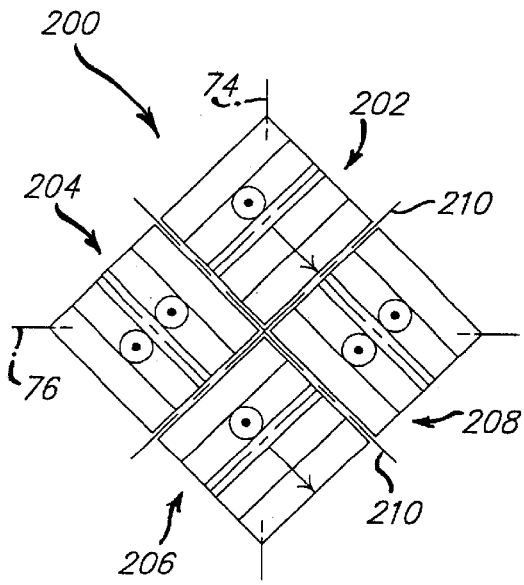
FIG. 15*d* illustrates an end view of a second multi-stable thrust vectoring nozzle in a 315° thrust oblique lateral thrust state.

Referring to FIG. 15a, in a 135° thrust oblique lateral thrust state, multi-stable thrust vectoring nozzle elements 202 and 206 are respectively operated in outboard and inboard oblique lateral thrust states, and multi-stable thrust vectoring nozzle elements 204 and 208 are each operated in maximum thrust longitudinal thrust states. Referring to FIG. 15b, in a 450 thrust oblique lateral thrust state, multi-stable thrust vectoring nozzle elements 208 and 204 are respectively operated in outboard and inboard oblique lateral thrust states, and multi-stable thrust vectoring nozzle elements 202 and 206 are each operated in maximum thrust longitudinal thrust states. Referring to FIG. 15c, in a 225° thrust oblique lateral thrust state, multi-stable thrust vectoring nozzle elements 204 and 208 are respectively operated in outboard and inboard oblique lateral thrust states, and multi-stable thrust vectoring nozzle elements 202 and 206 are each operated in maximum thrust longitudinal thrust states. Referring to FIG. 15d, in a 315° thrust oblique lateral thrust state, multi-stable thrust vectoring nozzle elements 206 and 202 are respectively operated in outboard and inboard oblique lateral thrust states, and multi-stable thrust vectoring nozzle elements 204 and 208 are each operated in maximum thrust longitudinal thrust states. Alternately, for reduced longitudinal thrust, in the embodiments of FIGS. 15a–d, the multi-stable thrust vectoring nozzle elements that are illustrated as operating in the maximum thrust longitudinal thrust state as illustrated in FIG. 10b may be alternately operated in the reduced thrust longitudinal thrust state as illustrated in FIG. 10e.

Figure 16A:
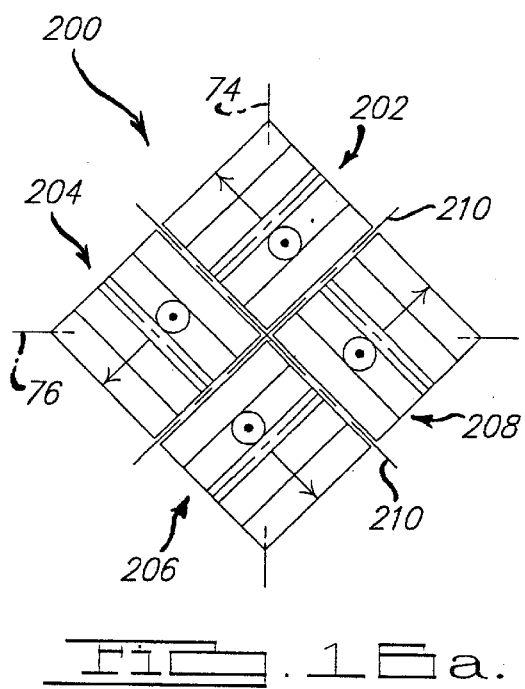
FIG. 16*a* illustrates an end view of a second multi-stable thrust vectoring nozzle in a counterclockwise thrust oblique roll thrust state.
Figure 16B:
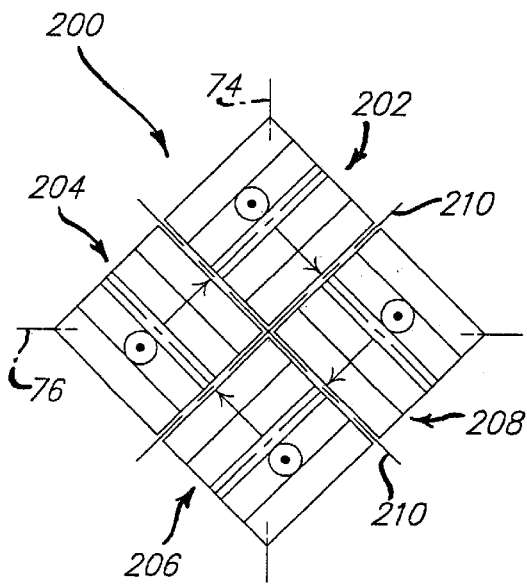
FIG. 16*b* illustrates an end view of a second multi-stable thrust vectoring nozzle in a clockwise thrust oblique roll thrust state.

Referring to FIG. 16a, in a counterclockwise thrust oblique roll thrust state, causing the object being thrusted to roll in a clockwise direction along the direction of travel, each of the multi-stable thrust vectoring nozzle elements 202, 204, 206 and 208 are operated in an outboard oblique lateral thrust state. Referring to FIG. 16b, in a clockwise thrust oblique roll thrust state, causing the object being thrusted to roll in a counterclockwise direction along the direction of travel, each of the multi-stable thrust vectoring nozzle elements 202, 204, 206 and 208 are operated in an inboard oblique lateral thrust state.

Figure 17A:
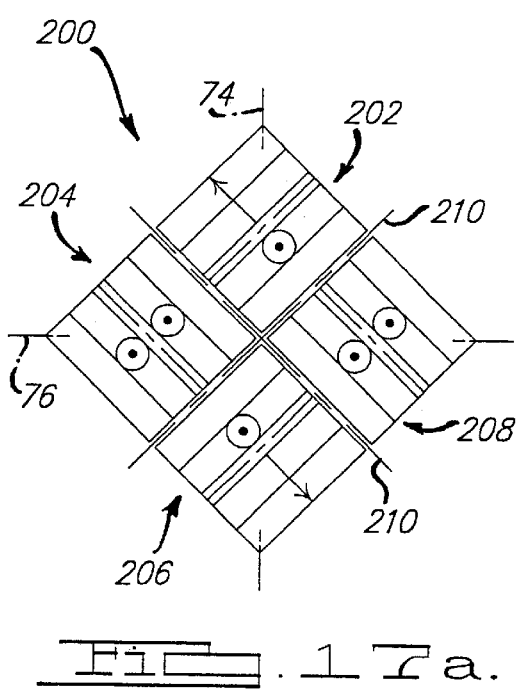
FIG. 17*a* illustrates an end view of a second multi-stable thrust vectoring nozzle in a first counterclockwise thrust oblique roll thrust state exhibiting reduced roll thrust.
Figure 17B:
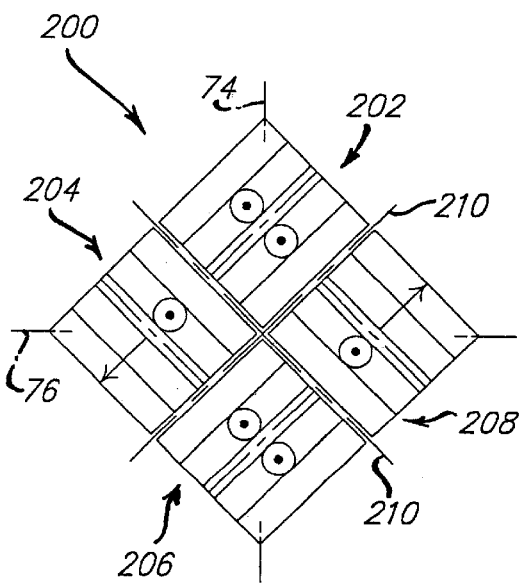
FIG. 17*b* illustrates an end view of a second multi-stable thrust vectoring nozzle in a second counterclockwise thrust oblique roll thrust state exhibiting reduced roll thrust.
Figure 17C:
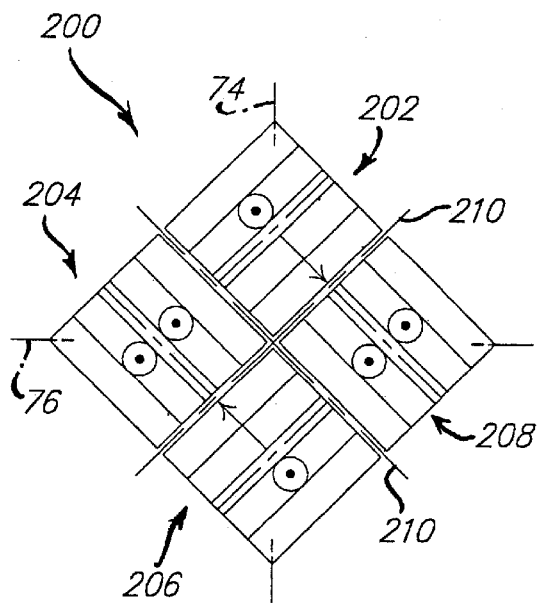
FIG. 17*c* illustrates an end view of a second multi-stable thrust vectoring nozzle in a first clockwise thrust oblique roll thrust state exhibiting reduced roll thrust.
Figure 17D:
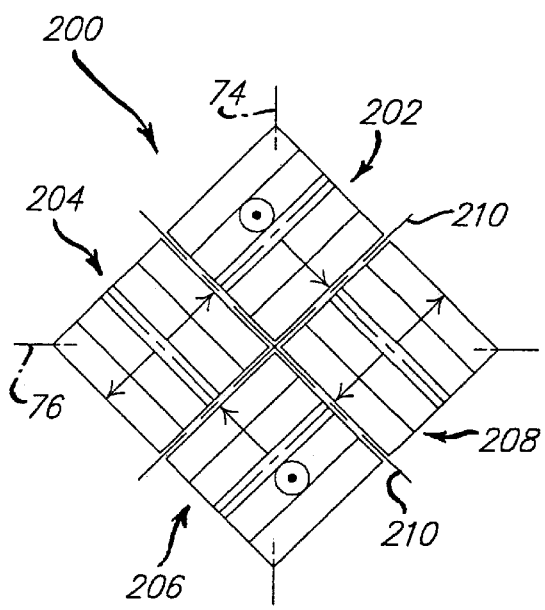
FIG. 17*d* illustrates an end view of a second multi-stable thrust vectoring nozzle in a second clockwise thrust oblique roll thrust state exhibiting reduced roll thrust and reduced longitudinal thrust.

Referring to FIG. 17a, in a first counterclockwise thrust oblique roll thrust state exhibiting reduced roll thrust, opposing multi-stable thrust vectoring nozzle elements 202 and 206 are operated in an outboard oblique lateral thrust state and remaining multi-stable thrust vectoring nozzle elements 204 and 208 are each operated in a maximum thrust longitudinal thrust state. Referring to FIG. 17b, in a second counterclockwise thrust oblique roll thrust state exhibiting reduced roll thrust, opposing multi-stable thrust vectoring nozzle elements 204 and 208 are operated in an outboard oblique lateral thrust state and remaining multi-stable thrust vectoring nozzle elements 202 and 206 are each operated in a maximum thrust longitudinal thrust state. Referring to FIG. 17c, in a first clockwise thrust oblique roll thrust state exhibiting reduced roll thrust, opposing multi-stable thrust vectoring nozzle elements 202 and 206 are operated in an inboard oblique lateral thrust state and remaining multi-stable thrust vectoring nozzle elements 204 and 208 are each operated in a maximum thrust longitudinal thrust state. Referring to FIG. 17d, in a second clockwise thrust oblique roll thrust state exhibiting reduced roll thrust and reduced longitudinal thrust, opposing multi-stable thrust vectoring nozzle elements 202 and 206 are operated in an inboard oblique lateral thrust state and remaining multi-stable thrust vectoring nozzle elements 204 and 208 are each operated in a reduced thrust longitudinal thrust state.

Whereas the second multi-stable thrust vectoring nozzle 200 has been illustrated with the respective multi-stable thrust vectoring nozzle elements 202, 204, 206 and 208 clustered adjacent to one another, other arrangements are possible within the scope of the instant invention. For example, the multi-stable thrust vectoring nozzle elements 202, 204, 206 and 208 may be separated from one another, preferably in a manner that preserves symmetry about the nozzle axis 212. The magnitude of the roll thrust component in an oblique roll thrust operating state increases with increasing separation distance. Furthermore, the angular orientation of the individual multi-stable thrust vectoring nozzle elements 202, 204, 206 and 208 can be adapted so as to modify the relative amounts of vertical and horizontal thrust when operated in the respective vertical and horizontal thrust states. Furthermore, whereas the multi-stable thrust vectoring nozzle elements 202, 204, 206 and 208 have been illustrated with substantially square cross-sections, neither the cross-sectional shape nor the aspect ratio thereof are considered to be limiting.

Figure 18:
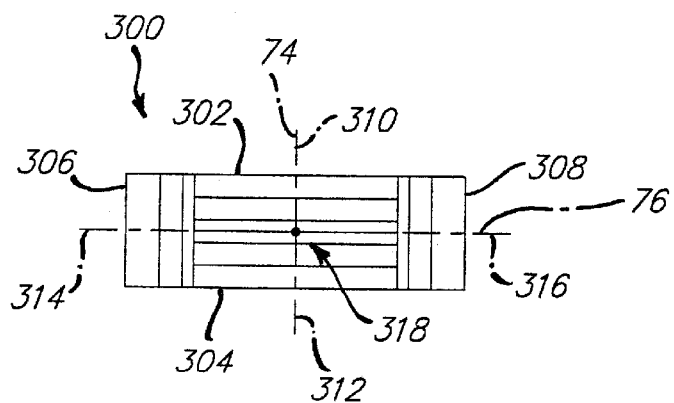
FIG. 18 illustrates an end view of a third multi-stable thrust vectoring nozzle showing the lateral thrust axes for each of the associated four bi-stable thrust vectoring nozzle elements.

Referring to FIG. 18, a third multi-stable thrust vectoring nozzle 300 comprises first 302, second 304, third 306 and fourth 308 bi-stable thrust vectoring nozzle elements each with respective lateral thrust axes 310, 312, 314 and 316, wherein the first 302 and second 304 bi-stable thrust vectoring nozzle elements are disposed with respective first surfaces back-to-back and respective lateral thrust axes 310 and 312 co-linear with one another and aligned with the vertical (yaw) axis 74 of the object being thrusted; and the third 306 and fourth 308 bi-stable thrust vectoring nozzle elements are disposed respectively to the left and right of the first 302 and second 304 bi-stable thrust vectoring nozzle elements and the respective lateral thrust axes 314 and 316 are colinear with one another and aligned with the horizontal (pitch) axis 76 of the object being thrusted.

The third multi-stable thrust vectoring nozzle 300 is characterized by $2^4=16$ thrust is states of the four bi-stable thrust vectoring nozzle elements 302, 304, 306, and 308, as schematically illustrated in FIGS. 19a–p. More particularly, FIGS. 19a–d illustrate various longitudinal thrust states, with the longitudinal thrust of the state of FIGS. 19b–c substantially the same, but less than that of the state of FIG. 19a, and greater then that of the state of FIG. 19d. FIGS. 19e–f illustrate respective leftward thrust oblique lateral thrust states with respectively decreasing levels of longitudinal thrust. FIGS. 19g–h illustrate respective rightward thrust oblique lateral thrust states with respectively decreasing levels of longitudinal thrust. FIGS. 19i–j illustrate respective upward thrust oblique lateral thrust states with respectively decreasing levels of longitudinal thrust. FIGS. 19k–l illustrate respective downward thrust oblique lateral thrust states with respectively decreasing levels of longitudinal thrust. FIGS. 19m–p illustrate respective 135°, 225°, 315° and 45° oblique lateral thrust states.

The embodiments of FIG. 18 and FIGS. 19a–p provide oblique lateral thrust states with a combination of lateral and longitudinal thrust, enabling independent control of pitch and yaw, but no control of roll because the respective lateral thrust axes 310, 312, 314 and 316 intersect one another along the longitudinal nozzle axis 318. Whereas elements 306 and 308 are illustrated in an orientation to provide outboard oblique lateral thrust, these elements may also be interchanged so as to respectively provide for inboard oblique lateral thrust; as is also possible for elements 310 and 312.

Referring to FIG. 20, a fourth multi-stable thrust vectoring nozzle 400 comprises first 402, second 404, third 406, fourth 408, fifth 410 and sixth 412 bi-stable thrust vectoring nozzle elements wherein, when operated in the oblique lateral thrust state, elements 402 and 404 are oriented to provide upward oblique lateral thrust; elements 406 and 408 are oriented to provide downward oblique lateral thrust; element 410 is oriented to provide leftward oblique lateral thrust; element 412 is oriented to provide rightward oblique lateral thrust; elements 402 and 404, and 406 and 408 are respectively adjacent to one another; elements 402 and 404, 406 and 408, and 410 and 412 are respectively symmetric about the vertical (yaw) axis 74, and elements 402 and 406, and 404 and 408 are respectively symmetric about the horizontal (pitch) axis 76.

The fourth multi-stable thrust vectoring nozzle 400 is characterized by $2^6=64$ thrust states. Of these, FIG. 21a illustrates a clockwise oblique roll thrust state with maximum longitudinal thrust, and FIG. 21b illustrates a counterclockwise roll thrust state with minimum longitudinal thrust.

Referring to FIG. 22, a fifth multi-stable thrust vectoring nozzle 500 comprises first 502, second 504, third 506, fourth 508, fifth 510 and sixth 512 bi-stable thrust vectoring nozzle elements wherein, when operated in the oblique lateral thrust state, elements 502 and 504 are oriented to provide upward oblique lateral thrust; elements 506 and 508 are oriented to provide downward oblique lateral thrust; element 510 is oriented to provide leftward oblique lateral thrust; element 512 is oriented to provide rightward oblique lateral thrust; elements 502 and 506, 504 and 508, and 510 and 512, are adjacent to one another with respective first surfaces back-to-back, elements 502 and 504, and 506 and 508 are respectively outboard of elements 510 and 512; elements 502 and 504, 506 and 508, and 510 and 512 are respectively symmetric about the vertical (yaw) axis 74, and elements 502 and 506, and 504 and 508 are respectively symmetric about the horizontal (pitch) axis 76.

In comparison with the fourth multi-stable thrust vectoring nozzle 400, the fifth multi-stable thrust vectoring nozzle 500 provides for increased roll thrust because of the increased lateral separation of elements 502 and 504, and 506 and 508; and can provide for increased lateral thrust as a result of the interaction of stream of primary gas from element 512 with the streams of primary gas from elements 504 and 508 during rightward thrust, and the interaction of stream of primary gas from element 510 with the streams of primary gas from elements 502 and 506 during leftward thrust.

Figure 23C:
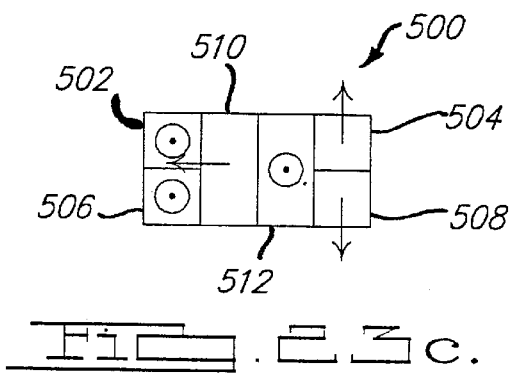
Figure 23D:
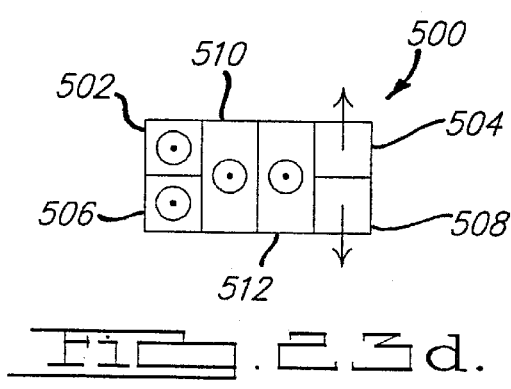
Figure 23E:
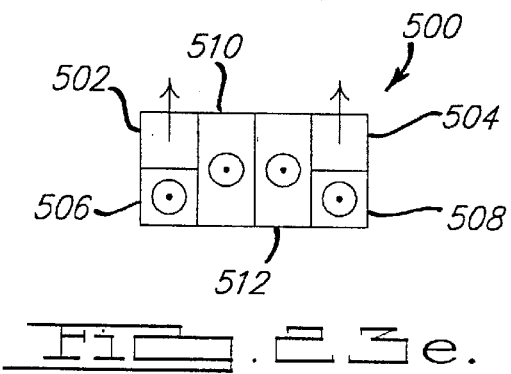
Figure 23F:
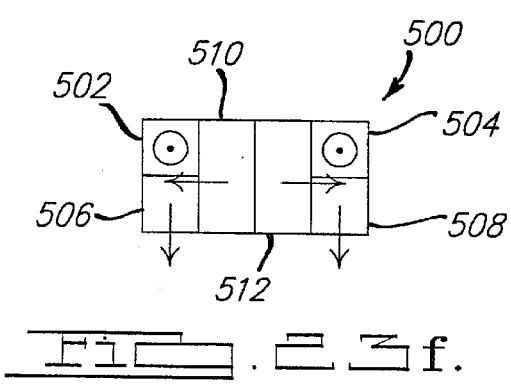

The fifth multi-stable thrust vectoring nozzle 500 is characterized by $2^6=64$ thrust states. Of these, FIG. 23a illustrates a clockwise oblique roll thrust state with maximum longitudinal thrust; FIG. 23b illustrates a counterclockwise roll thrust state with reduced longitudinal thrust; FIG. 23c illustrates a leftward oblique lateral thrust state with reduced associated longitudinal thrust; FIG. 23d illustrates and asymmetric longitudinal thrust state that causes rightward yaw; FIG. 23e illustrates an upward oblique lateral thrust state with maximum associated longitudinal thrust; and FIG. 23f illustrates a downward oblique lateral thrust state with reduced associated longitudinal thrust.

Figure 24:
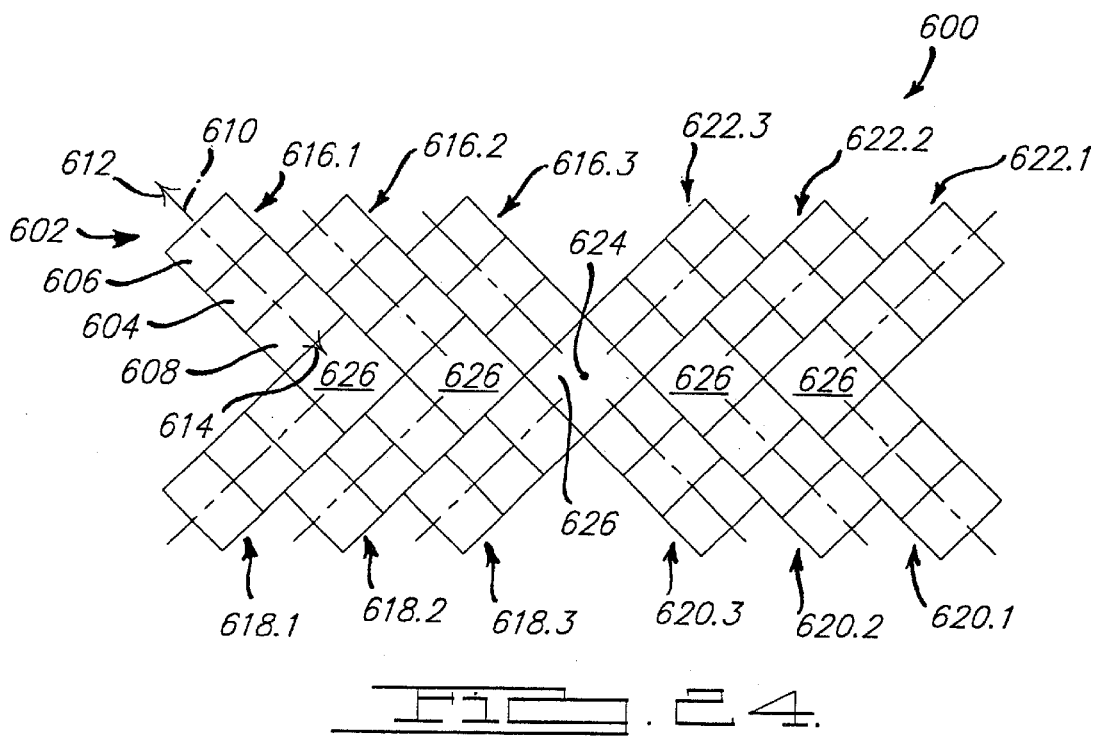
FIG. 24 illustrates an end view of a sixth multi-stable thrust vectoring nozzle comprising a plurality of bi-stable thrust vectoring nozzle elements that are arranged symmetrically with respect to a central longitudinal axis.

Referring to FIG. 24, a sixth multi-stable thrust vectoring nozzle 600 comprises a plurality of bi-stable thrust vectoring nozzle elements 602, each comprising a nozzle throat 604 and first 606 and second 608 surfaces extending therefrom, wherein a stream of primary gas exiting from the nozzle throat 604 attaches to either the first 606 or second 608 surface responsive to control signals at associated control ports that are operatively coupled to the respective first 606 and second 608 surfaces in accordance with the teachings hereinabove so as to provide for an oblique lateral thrust vector having a lateral thrust vector component along the associated lateral axis 610 of the bi-stable thrust vectoring nozzle elements 602. The first 606 and second 608 surfaces are disposed so that in a first control state the oblique lateral thrust is directed in a first lateral direction 612 along the lateral axis 610, and in a second control state the oblique lateral thrust is directed in a second lateral direction 614 along the lateral axis 610, opposite to the first lateral direction 612. A first plurality of bi-stable thrust vectoring nozzle elements 616.1, 616.2 and 616.3 are arranged with respective lateral axes 610 oriented in a first direction. A second plurality of bi-stable thrust vectoring nozzle elements 618.1, 618.2 and 618.3 are arranged with respective lateral axes 610 oriented in a second direction that is linearly independent of the first direction, and preferably orthogonal to the first direction. A third plurality of bi-stable thrust vectoring nozzle elements 620.1, 620.2 and 620.3 are arranged with respective lateral axes 610 substantially oriented along the first direction and a fourth plurality of bi-stable thrust vectoring nozzle elements 622.1, 622.2 and 622.3 are arranged with respective lateral axes 610 substantially oriented along the second direction, wherein the respective pairs of lateral axes 610 for the first and third pluralities of bi-stable thrust vectoring nozzle elements 616.1 and 620.1, 616.2 and 620.2, and 616.3 and 620.3 are symmetric with respect to a central longitudinal axis 624, as are the respective pairs of lateral axes 610 for the second and fourth pluralities of bi-stable thrust vectoring nozzle elements 618.1 and 622.1, 618.2 and 622.2, and 618.3 and 622.3. Accordingly, as for the second multi-stable thrust vectoring nozzle 200, there exist control modes of the sixth multi-stable thrust vectoring nozzle 600 comprising the control states of the respective bi-stable thrust vectoring nozzle elements 602 for which the net thrust therefrom provides for either pure longitudinal thrust, oblique yaw thrust in opposing yaw directions, oblique pitch thrust in opposing pitch directions, and oblique roll thrust in opposing roll directions.

In the exemplary embodiment illustrated in FIG. 24, the respective bi-stable thrust vectoring nozzle elements 602 are arranged symmetric with respect to the pitch and yaw axes, which provides for a plurality of central zones 626 that can be used to accommodate one or more discharge nozzles from an associated one or more ejector pumps 44 that provide the sources or pressure 26 and vacuum 28 for controlling the bi-stable thrust vectoring nozzle elements 602, wherein the exhaust from the ejector pumps 44 also provides longitudinal thrust. Alternately, longitudinal thrust nozzles may be incorporated in the central zones 626.

One advantage of the sixth multi-stable thrust vectoring nozzle 600 is that by increasing the plurality of bi-stable thrust vectoring nozzle elements 602, for the same thrust level, the overall aspect ratio (width/height) can be increased thereby providing a relatively low profile thruster that for example would be suited for placement proximate the trailing edge of a flight surface. This arrangement provides for the propulsion and control of an aircraft without any exposed moving surfaces, which provides for reduced radar cross section and reduced drag.

The bi-stable thrust vectoring nozzle elements 602 are illustrated with the first 606 and second 608 surfaces substantially symmetric with respect to the associated longitudinal axis of the nozzle, thereby providing an increased ratio of net lateral to net longitudinal thrust, which provides for increase maneuverability, but with decreased maximum longitudinal thrust in a pure longitudinal thrust control mode. Alternately, the maximum longitudinal thrust may be increased, for example by using a pair of back-to-back asymmetric bi-stable thrust vectoring nozzle elements in place of each symmetric bi-stable thrust vectoring nozzle element 602, as illustrated for the second multi-stable thrust vectoring nozzle 200. Moreover, the second 200, third 300, fourth 400 and fifth 500 multi-stable thrust vectoring nozzles can alternately incorporate symmetric bi-stable thrust vectoring nozzle elements instead of asymmetric elements as illustrated so as to provide for an increased ratio of lateral to longitudinal thrust, thereby increasing maneuverability.

Whereas FIGS. 10a–d, 11, 12a–c, 13a–b, 14a–b, 15a–d, 16a–b, 17a–d, 18, 19a–p, 20, 21a–b, 22, and 23a–f illustrate end views of various multi-stable thrust vectoring nozzle elements in various operating states, it will be understood by one of ordinary skill in the art that each associated bi-stable thrust vectoring nozzle element has an associated control valve, control ports, sources of pressure and vacuum, and interconnected plumbing as necessary to provide for operation and control thereof, as for example in accordance with that illustrated in FIGS. 1, 2, 4a–c, 6a–c, 7a–c, 8a–c and 9a–c and described hereinabove. Furthermore, whereas the FIGS. 4b–c, 6b–c, 7b–c, 8b–c and 9b–c illustrate separate sources of pressure and vacuum for distinct bi-stable thrust vectoring nozzle elements, preferably a common source of pressure and a common source of vacuum are used for the associated bi-stable thrust vectoring nozzle elements.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

1. A bi-stable thrust vectoring nozzle for discharging a stream of primary gas, comprising:
   a. a throat from which the stream of primary gas flows;
   b. a first surface extending downstream from said throat;
   c. a second surface extending downstream from said throat, wherein said bi-stable thrust vectoring nozzle has a central axis along which the stream of primary gas discharges from said throat in the absence of said first and second surfaces, said bi-stable thrust vectoring nozzle has a first axis along which the stream of primary gas discharges from said bi-stable thrust vectoring nozzle when the stream of primary gas is attached to said first surface, said bi-stable thrust vectoring nozzle has a second axis along which the stream of primary gas discharges from said bi-stable thrust vectoring nozzle when the stream of primary gas is attached to said second surface, and the angle between said first axis and said central axis is substantially different from the angle between said second axis and said central axis;
   d. at least one first port operatively coupled to said first surface; and
   e. at least one second port operatively coupled to said second surface.

2. A bi-stable thrust vectoring nozzle for discharging a stream of primary gas as recited in claim 1, further comprising a source of pressure differential operatively coupled between said first port and said second port for causing said stream of primary gas to become attached to one of said first surface and said second surface.

3. A bi-stable thrust vectoring nozzle for discharging a stream of primary gas as recited in claim 2, wherein said source of pressure differential comprises a source selected from the group consisting of a source of pressure applied to one of said at least one first port and said at least one second port, a source of vacuum applied to one of said at least one first port and said at least one second port, and an ejector pump powered by at least a portion of said stream of primary gas.

4. A bi-stable thrust vectoring nozzle for discharging a stream of primary gas as recited in claim 2, further comprising a control valve, wherein said control valve in a first state operatively couples a source of vacuum to said at least one first port and operatively couples a source of pressure to said at least one second port, and said control valve in a second state operatively couples a source of vacuum to said at least one second port and operatively couples a source of pressure to said at least one first port.

5. A bi-stable thrust vectoring nozzle for discharging a stream of primary gas, comprising:
   a. a throat from which the stream of primary gas flows;
   b. a first surface extending downstream from said throat;
   c. a second surface extending down stream from said throat, wherein said bi-stable thrust vectoring nozzle has a first axis along which the stream of primary gas discharges from said bi-stable thrust vectoring nozzle when the stream of primary gas is attached to said first surface, said bi-stable thrust vectoring nozzle has a second axis along which the stream of primary gas discharges from said bi-stable thrust vectoring nozzle when the stream of primary gas is attached to said second surface, said bi-stable thrust vectoring nozzle is operatively coupled to an object having a longitudinal axis along which said object travels when said object travels straight along a forward direction, and the angle between said first axis and said longitudinal axis is substantially different from the angle between said second axis and said longitudinal axis;

d. at least one first port operatively coupled to said first surface; and e. at least one second port operatively coupled to said second surface.

6. A bi-stable thrust vectoring nozzle for discharging a stream of primary gas as recited in claim 5, further comprising a source of pressure differential operatively coupled between said first port and said second port for causing said stream of primary gas to become attached to one of said first surface and said second surface.

7. A bi-stable thrust vectoring nozzle for discharging a stream of primary gas as recited in claim 6, said source of pressure differential comprises a source of pressure differential selected from the group consisting of a source of pressure applied to one of said at least one first port and said at least one second port, a source of vacuum applied to one of said at least one first port and said at least one second port, and an ejector pump powered by at least a portion of said stream of primary gas.

8. A bi-stable thrust vectoring nozzle for discharging a stream of primary gas as recited in claim 6, further comprising a control valve, wherein said control valve in a first state operatively couples a source of vacuum to said at least one first port and operatively couples a source of pressure to said at least one second port, and said control valve in a second state operatively couples a source of vacuum to said at least one second port and operatively couples a source of pressure to said at least one first port.

9. A multi-stable thrust vectoring nozzle for discharging a stream of primary gas, comprising:

a. first and second throats;

b. a first outer surface diverging from said first throat in first lateral direction relative to a longitudinal axis;

c. a first inner surface extending from said first throat and opposed to said first outer surface;

d. a second outer surface diverging from said second throat in a direction opposite to said first lateral direction relative to said longitudinal axis;

e. a second inner surface extending from said second throat and opposed to said second outer surface;

f. at least one first port operatively coupled to said first outer surface;

g. at least one second port operatively coupled to said first inner surface;

h. at least one third port operatively coupled to said second outer surface; and i. at least one fourth port operatively coupled to said second inner surface.

10. A multi-stable thrust vectoring nozzle for discharging a stream of primary gas as recited in claim 9, wherein said first and second inner surfaces are proximate to one another on opposite sides of a first flow separator disposed between said first and second nozzle throats.

11. A multi-stable thrust vectoring nozzle for discharging a stream of primary gas as recited in claim 9, further comprising:

a. a first source of pressure differential operatively coupled between said first port and said second port for causing said stream of primary gas to become attached to one of said first outer surface and said first inner surface; and b. a second source of pressure differential operatively coupled between said third port and said fourth port for causing said stream of primary gas to become attached to one of said second outer surface and said second inner surface.

12. A multi-stable thrust vectoring nozzle for discharging a stream of primary gas as recited in claim 11, wherein said first and second sources of pressure differential comprise sources selected from the group consisting of a source of pressure applied to one of said at least one first port and said at least one second port, a source of vacuum applied to one of said at least one first port and said at least one second port, and an ejector pump powered by at least a portion of said stream of primary gas.

13. A multi-stable thrust vectoring nozzle for discharging a stream of primary gas as recited in claim 11, further comprising:

a. a first control valve, wherein said first control valve in a first state operatively couples a source of vacuum to said at least one first port and operatively couples a source of pressure to said at least one second port, and said first control valve in a second state operatively couples a source of vacuum to said at least one second port and operatively couples a source of pressure to said at least one first port; and b. a second control valve, wherein said second control valve in a first state operatively couples a source of vacuum to said at least one third port and operatively couples a source of pressure to said at least one fourth port, and said second control valve in a second state operatively couples a source of vacuum to said at least one fourth port and operatively couples a source of pressure to said at least one third port.

14. A multi-stable thrust vectoring nozzle for discharging a stream of primary gas as recited in claim 9, further comprising:

a. third and fourth throats;

b. a third outer surface diverging from said third throat in second lateral direction relative to said longitudinal axis, wherein said second lateral direction is linearly independent of said first lateral direction;

c. a third inner surface extending from said third throat and opposed to said third outer surface;

d. a fourth outer surface diverging from said fourth throat in a direction opposite to said second lateral direction relative to said longitudinal axis;

e. a fourth inner surface extending from said fourth throat and opposed to said fourth outer surface;

f. at least one fifth port operatively coupled to said third outer surface;

g. at least one sixth port operatively coupled to said third inner surface;

h. at least one seventh port operatively coupled to said fourth outer surface; and i. at least one eighth port operatively coupled to said fourth inner surface.

15. A multi-stable thrust vectoring nozzle for discharging a stream of primary gas as recited in claim 10, wherein said third and fourth inner surfaces are proximate to one another on opposite sides of a second flow separator disposed between said third and fourth nozzle throats.

16. A multi-stable thrust vectoring nozzle for discharging a stream of primary gas as recited in claim 11, further comprising:
 a. a third source of pressure differential operatively coupled between said fifth port and said sixth port for causing said stream of primary gas to become attached to one of said third outer surface and said third inner surface; and
 b. a fourth source of pressure differential operatively coupled between said seventh port and said eighth port for causing said stream of primary gas to become attached to one of said fourth outer surface and said fourth inner surface.

17. A multi-stable thrust vectoring nozzle for discharging a stream of primary gas as recited in claim 12, wherein said first, second, third and fourth sources of pressure differential comprise sources selected from the group consisting of a source of pressure applied to one of said at least one first port and said at least one second port, a source of vacuum applied to one of said at least one first port and said at least one second port, and an ejector pump powered by at least a portion of said stream of primary gas.

18. A multi-stable thrust vectoring nozzle for discharging a stream of primary gas as recited in claim 13, further comprising:
 a. a third control valve, wherein said third control valve in a first state operatively couples a source of vacuum to said at least one fifth port and operatively couples a source of pressure to said at least one sixth port, and said third control valve in a second state operatively couples a source of vacuum to said at least one sixth port and operatively couples a source of pressure to said at least one fifth port; and
 b. a fourth control valve, wherein said fourth control valve in a first state operatively couples a source of vacuum to said at least one seventh port and operatively couples a source of pressure to said at least one eighth port, and said fourth control valve in a second state operatively couples a source of vacuum to said at least one eighth port and operatively couples a source of pressure to said at least one seventh port.

19. A multi-stable thrust vectoring nozzle for discharging a stream of primary gas, comprising:
 a. a first bi-stable thrust vectoring nozzle element having a first longitudinal axis and a first lateral axis, wherein said first longitudinal axis is normal to said first lateral axis and the thrust vector from said first bi-stable thrust vectoring nozzle comprises a vector component directed along said first longitudinal axis and a vector component directed along said first lateral axis;
 b. a second bi-stable thrust vectoring nozzle element having a second longitudinal axis and a second lateral axis, wherein said second longitudinal axis is normal to said second lateral axis and the thrust vector from said second bi-stable thrust vectoring nozzle comprises a vector component directed along said second longitudinal axis and a vector component directed along said second lateral axis; and
 c. a third bi-stable thrust vectoring nozzle element having a third longitudinal axis and a third lateral axis, wherein said third longitudinal axis is normal to said third lateral axis and the thrust vector from said second bi-stable thrust vectoring nozzle comprises a vector component directed along said third longitudinal axis and a vector component directed along said third lateral axis; said first, said second and said third longitudinal axes are parallel to one another and to a central longitudinal axis; said first lateral axis is oriented along a first direction; said second lateral axis is oriented along a second direction that is linearly independent of said first direction; said third lateral axis is oriented along said second direction; said first bi-stable thrust vectoring nozzle element is located between said second and third bi-stable thrust vectoring nozzle elements; and each of said first, said second, and said third bi-stable thrust vectoring nozzle elements comprise:
 i. a nozzle throat;
 ii. a first surface extending from said nozzle throat;
 iii. a second surface extending from said nozzle throat, wherein at least one of said first and second surfaces diverges from said longitudinal axis in a direction that is parallel to said lateral axis of the bi-stable thrust vectoring nozzle element;
 iv. at least one first port operatively coupled to said first surface; and
 v. at least one second port operatively coupled to said second surface, wherein the stream of primary gas discharges from said nozzle throat, in a first control state said stream of primary gas attaches to said first surface responsive to a first differential control signal between said first and second ports, and in a second control state said stream of primary gas attaches to said second surface responsive to a second differential control signal between said first and second ports.

20. A multi-stable thrust vectoring nozzle for discharging a stream of primary gas as recited in claim 19, wherein said second and said third lateral axes are substantially coincident.

21. A multi-stable thrust vectoring nozzle for discharging a stream of primary gas as recited in claim 19, wherein said second and said third lateral axes are separated from one another.

22. A multi-stable thrust vectoring nozzle for discharging a stream of primary gas, comprising:
 a. a first bi-stable thrust vectoring nozzle element having a first longitudinal axis and a first lateral axis, wherein said first longitudinal axis is normal to said first lateral axis and the thrust vector from said first bi-stable thrust vectoring nozzle comprises a vector component directed along said first longitudinal axis and a vector component directed along said first lateral axis;
 b. a second bi-stable thrust vectoring nozzle element having a second longitudinal axis and a second lateral axis, wherein said second longitudinal axis is normal to said second lateral axis and the thrust vector from said second bi-stable thrust vectoring nozzle comprises a vector component directed along said second longitudinal axis and a vector component directed along said second lateral axis;
 c. a third bi-stable thrust vectoring nozzle element having a third longitudinal axis and a third lateral axis, wherein said third longitudinal axis is normal to said third lateral axis and the thrust vector from said second bi-stable thrust vectoring nozzle comprises a vector component directed along said third longitudinal axis and a vector component directed along said third lateral axis; and
 d. a fourth bi-stable thrust vectoring nozzle element having a fourth longitudinal axis and a fourth lateral axis, wherein said fourth longitudinal axis is normal to said fourth lateral axis and the thrust vector from said second bi-stable thrust vectoring nozzle comprises a vector component directed along said fourth longitudinal axis and a vector component directed along said fourth lateral axis; said first, said second said third and said fourth longitudinal axes are parallel to one another and to a central longitudinal axis; said first lateral axis is oriented along a first direction; said second lateral axis is oriented along a second direction that is linearly independent of said first direction; said third lateral axis is oriented along said first direction; said fourth lateral axis is oriented along said second direction; said first and third lateral axes are normal and symmetric with respect to said central longitudinal axis; said second and fourth lateral axes are normal and symmetric with respect to said central longitudinal axis; and each of said first, said second, said third and said fourth bi-stable thrust vectoring nozzle elements comprise:
  i. a nozzle throat;
  ii. a first surface extending from said nozzle throat;
  iii. a second surface extending from said nozzle throat, wherein at least one of said first and second surfaces diverges from said longitudinal axis in a direction that is parallel to said lateral axis of the bi-stable thrust vectoring nozzle element;
  iv. at least one first port operatively coupled to said first surface; and
  v. at least one second port operatively coupled to said second surface, wherein the stream of primary gas discharges from said nozzle throat, in a first control state said stream of primary gas attaches to said first surface responsive to a first differential control signal between said first and second ports, and in a second control state said stream of primary gas attaches to said second surface responsive to a second differential control signal between said first and second ports.

23. A multi-stable thrust vectoring nozzle for discharging a stream of primary gas as recited in claim 22, wherein said first and third lateral axes are displaced from said central longitudinal axis.

24. A multi-stable thrust vectoring nozzle for discharging a stream of primary gas as recited in claim 23, wherein said second and fourth lateral axes are displaced from said central longitudinal axis.

25. A method of controlling the direction of thrust by a stream of gas through a bi-stable nozzle operatively coupled to an object to be thrusted, wherein the object has a direction of forward travel, comprising:
  a. in a first thrusting state, causing a stream of gas to attach to a first surface wherein said first surface is oriented so that the stream of gas exiting from said bi-stable nozzle is directed substantially parallel to the direction of forward travel of the object; and
  b. in a second thrusting state, causing the said stream of gas to attach to a second surface wherein said second surface is oriented so that the stream of gas exiting from said bi-stable nozzle is directed with a component of flow that is normal to said direction of forward travel of the object.

26. A method of thrusting and controlling the trajectory of an object, wherein the object has three mutually orthogonal axes comprising a longitudinal axis, a pitch axis, and a yaw axis, comprising:
  a. operatively coupling a plurality of bi-stable thrust vectoring nozzle elements to the object;
  b. generating a thrust vector from each said bi-stable thrust vectoring nozzle element by directing a stream of primary gas through each said bi-stable thrust vectoring nozzle element, wherein each bi-stable thrust vectoring nozzle element operates in one of two control states, in a first control state said thrust vector is directed in a first vector direction, and in a second control state said thrust vector is directed in a second vector direction; and
  c. controlling the control states of each of said bi-stable thrust vectoring nozzle elements of said plurality in accordance with a control mode so as to generate an associated plurality of thrust vectors, wherein said plurality of bi-stable thrust vectoring nozzle elements are oriented with respect to said object so that in a first control mode the combination of said thrust vectors generates a net thrust along the longitudinal axis; in a second control mode the combination of said thrust vectors generates a net thrust having a longitudinal component along the longitudinal axis, and a lateral component orthogonal to said longitudinal axis, wherein said lateral component is directed parallel to the pitch axis in a first yaw direction; in a third control mode the combination of said thrust vectors generates a net thrust having a longitudinal component along the longitudinal axis, and a lateral component orthogonal to said longitudinal axis, wherein said lateral component is directed parallel to the pitch axis in a second yaw direction opposite to said first yaw direction; in a fourth control mode the combination of said thrust vectors generates a net thrust having a longitudinal component along the longitudinal axis, and a lateral component orthogonal to said longitudinal axis, wherein said lateral component is directed parallel to the yaw axis in a first pitch direction; and in a fifth control mode the combination of said thrust vectors generates a net thrust having a longitudinal component along the longitudinal axis, and a lateral component orthogonal to said longitudinal axis, wherein said lateral component is directed parallel to the yaw axis in a second pitch direction opposite to said first pitch direction.

27. A method of thrusting and controlling the trajectory of an object as recited in claim 26, wherein in a sixth control mode the combination of said thrust vectors generates a net thrust having a longitudinal component along the longitudinal axis, and a roll thrust about the longitudinal axis in a first roll direction and in a seventh control mode the combination of said thrust vectors generates a net thrust having a longitudinal component along the longitudinal axis, and a roll thrust about the longitudinal axis in a second roll direction opposite to said first roll direction.

* * * * *